(12) United States Patent
Crabtree et al.

(10) Patent No.: US 11,070,592 B2
(45) Date of Patent: *Jul. 20, 2021

(54) SYSTEM AND METHOD FOR SELF-ADJUSTING CYBERSECURITY ANALYSIS AND SCORE GENERATION

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,551

(22) Filed: Apr. 1, 2020

(65) Prior Publication Data

US 2020/0374316 A1 Nov. 26, 2020

Related U.S. Application Data

(63) Continuation-in-part of application No. 16/777,270, filed on Jan. 30, 2020, which is a continuation-in-part
(Continued)

(51) Int. Cl.
*H04L 29/06* (2006.01)
*G06F 16/2458* (2019.01)
*G06F 16/951* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1441; H04L 63/1425; H04L 63/1433; G06F 16/951; G06F 16/2477
See application file for complete search history.

(56) References Cited

U.S. PATENT DOCUMENTS 6,256,544 B1 7/2001 Weissinger
7,530,105 B2 5/2009 Gilbert et al.
(Continued)

FOREIGN PATENT DOCUMENTS

WO 2014159150 A1 10/2014
WO 2017075543 A1 5/2017

*Primary Examiner* — Cheng-Feng Huang
(74) *Attorney, Agent, or Firm* — Galvin Patent Law LLC; Brian R. Galvin

(57) ABSTRACT

A system and method for self-adjusting cybersecurity analysis and score generation, wherein a reconnaissance engine gathers data about a client's computer network from the client, from devices and systems on the client's network, and from the Internet regarding various aspects of cybersecurity. Each of these aspects is evaluated independently, weighted, and cross-referenced to generate a cybersecurity score by aggregating individual vulnerability and risk factors together to provide a comprehensive characterization of cybersecurity risk using a transparent and traceable methodology. The scoring system itself can be used as a state machine with the cybersecurity score acting as a feedback mechanism, in which a cybersecurity score can be set at a level appropriate for a given organization, and data from clients or groups of clients with more extensive reporting can be used to supplement data for clients or groups of clients with less extensive reporting to enhance cybersecurity analysis and scoring.

4 Claims, 20 Drawing Sheets

Related U.S. Application Data of application No. 16/720,383, filed on Dec. 19, 2019, now Pat. No. 10,944,795, which is a continuation of application No. 15/823,363, filed on Nov. 27, 2017, now Pat. No. 10,560,483, and a continuation-in-part of application No. 15/725,274, filed on Oct. 4, 2017, now Pat. No. 10,609,079, application No. 16/837,551, which is a continuation-in-part of application No. 15/818,733, filed on Nov. 20, 2017, now Pat. No. 10,673,887, which is a continuation-in-part of application No. 15/725,274, which is a continuation-in-part of application No. 15/655,113, filed on Jul. 20, 2017, now Pat. No. 10,735,456, which is a continuation-in-part of application No. 15/616,427, filed on Jun. 7, 2017, and a continuation-in-part of application No. 15/237,625, filed on Aug. 15, 2016, now Pat. No. 10,248,910, which is a continuation-in-part of application No. 15/206,195, filed on Jul. 8, 2016, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(56) References Cited

U.S. PATENT DOCUMENTS

| | | | | |
|---|---|---|---|---|
| 8,281,121 | B2 | 10/2012 | Nath et al. | |
| 8,615,800 | B2* | 12/2013 | Baddour | G06F 16/951 726/22 |
| 8,793,758 | B2* | 7/2014 | Raleigh | H04M 15/00 726/1 |
| 8,914,878 | B2* | 12/2014 | Burns | H04L 63/1416 726/22 |
| 9,092,616 | B2* | 7/2015 | Kumar | H04L 63/1425 |
| 9,256,735 | B2 | 2/2016 | Stute | |
| 9,495,188 | B1* | 11/2016 | Ettema | G06F 9/45533 |
| 9,509,716 | B2* | 11/2016 | Shabtai | H04L 63/1425 |
| 9,560,065 | B2 | 1/2017 | Neil et al. | |
| 9,602,530 | B2 | 3/2017 | Ellis et al. | |
| 9,654,495 | B2* | 5/2017 | Hubbard | H04L 63/1483 |
| 9,749,343 | B2* | 8/2017 | Watters | H04L 63/1433 |
| 9,749,344 | B2* | 8/2017 | Watters | G06Q 10/00 |
| 9,762,443 | B2 | 9/2017 | Dickey | |
| 9,774,616 | B2* | 9/2017 | Flores | H04L 63/1433 |
| 9,860,208 | B1* | 1/2018 | Ettema | G06F 21/552 |
| 9,882,929 | B1* | 1/2018 | Ettema | G06F 9/45533 |
| 9,887,933 | B2 | 2/2018 | Lawrence, III | |
| 10,044,675 | B1* | 8/2018 | Ettema | H04L 63/1491 |
| 10,061,635 | B2 | 8/2018 | Ellwein | |
| 10,248,910 | B2 | 4/2019 | Crabtree et al. | |
| 10,367,829 | B2 | 7/2019 | Huang et al. | |
| 2002/0023122 | A1* | 2/2002 | Polizzi | G06F 16/972 709/202 |
| 2004/0255167 | A1* | 12/2004 | Knight | H04L 63/20 726/24 |
| 2005/0188423 | A1* | 8/2005 | Motsinger | H04L 67/22 726/22 |
| 2005/0198099 | A1* | 9/2005 | Motsinger | G06F 21/55 709/200 |
| 2005/0251863 | A1* | 11/2005 | Sima | H04L 63/12 726/25 |
| 2013/0304623 | A1* | 11/2013 | Kumar | G06Q 40/04 705/37 |
| 2015/0326608 | A1* | 11/2015 | Shabtai | H04L 63/1425 726/23 |
| 2016/0140519 | A1* | 5/2016 | Trepca | G06F 16/245 705/26.44 |
| 2016/0241580 | A1* | 8/2016 | Watters | H04L 63/1433 |
| 2016/0241581 | A1* | 8/2016 | Watters | H04L 63/1433 |
| 2016/0275123 | A1 | 9/2016 | Lin et al. | |

\* cited by examiner

SYSTEM AND METHOD FOR SELF-ADJUSTING CYBERSECURITY ANALYSIS AND SCORE GENERATION

CROSS-REFERENCE TO RELATED APPLICATIONS

| application Ser. No. | Date Filed | Title |
|---|---|---|
| Current application | Herewith | A SYSTEM AND METHOD FOR SELF-ADJUSTING CYBERSECURITY ANALYSIS AND SCORE GENERATION |
| | | Is a continuation-in-part of: |
| 15/818,733 | Nov. 20, 2017 | SYSTEM AND METHOD FOR CYBERSECURITY ANALYSIS AND SCORE GENERATION FOR INSURANCE PURPOSES |
| | | which is a continuation-in-part of: |
| 15/725,274 U.S. Pat. No. 10,609,079 | Oct. 4, 2017 Issue Date Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of: |
| 15/655,113 | Jul. 20, 2017 | ADVANCED CYBERSECURITY THREAT MITIGATION USING BEHAVIORAL AND DEEP ANALYTICS |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY |
| | | which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 Patented U.S. Pat. No. 10,204,147 | Apr. 5, 2016 Issued Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 Patented U.S. Pat. No. 10,210,255 | Dec. 31, 2015 Issued Date Feb. 19, 2019 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | A SYSTEM AND METHOD FOR SELF-ADJUSTING CYBERSECURITY ANALYSIS AND SCORE GENERATION |
| | | Is a continuation-in-part of: |
| 16/777,270 | Jan. 30, 2020 | CYBERSECURITY PROFILING AND RATING USING ACTIVE AND PASSIVE EXTERNAL RECONNAISSANCE |
| | | which is a continuation-in-part of: |

-continued

| application Ser. No. | Date Filed | Title |
|---|---|---|
| 16/720,383 | Dec. 19, 2019 | RATING ORGANIZATION CYBERSECURITY USING ACTIVE AND PASSIVE EXTERNAL RECONNAISSANCE which is a continuation of: |
| 15/823,363 U.S. Pat. No. 10,560,483 | Nov. 27, 2017 Issue Date Feb. 11, 2020 | RATING ORGANIZATION CYBERSECURITY USING ACTIVE AND PASSIVE EXTERNAL RECONNAISSANCE which is a continuation-in-part of: |
| 15/725,274 U.S. Pat. No. 10,609,079 | Oct. 4, 2017 Issue Date Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT which is a continuation-in-part of: |
| 15/655,113 | Jul. 20, 2017 | ADVANCED CYBERSECURITY THREAT MITIGATION USING BEHAVIORAL AND DEEP ANALYTICS which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH | the entire specification of each of which is incorporated herein by reference.

BACKGROUND OF THE INVENTION

Field of the Art

The disclosure relates to the field of cybersecurity, and more particularly to the fields of cyber insurance and data collection.

Discussion of the State of the Art

In the previous 20 years since the widespread advent of the internet and growth of internet-capable assets, multiple corporations, interest groups, and government agencies have come to take advantage of this connectivity for increased functionality and abilities. At the same time, the complexity and frequency of attacks on such assets and against such groups has increased, resulting numerous times in data loss, data corruption, compromised assets, data theft, loss of funds or resources, and in some cases increased intelligence by a rival group, including foreign governments and their agencies. It is currently possible to examine the state of a corporation or other group's network and determine basic security needs, inadequacies and goals, with various tools in the field today. This and similar efforts in cybersecurity are important not just for protecting assets, but for purposes such as determining the likelihood of data loss, potential asset compromises, determining the need for increased security, and the potential cost of insurance in the event of a cybersecurity incident. There are limitations to such efforts to acquire information about groups' network capabilities and vulnerabilities however, in both the data recorded and the method the data is recorded. Time-graphs and machine learning are not employed along with comprehensive, holistic reconnaissance efforts to establish full security profiles for clients. Data from many sources is not gathered properly due to the heterogeneous nature of the data, with sources of useful data differing in data content, format, the timespan in which new data is recorded or emitted, and scale and quantity of available data.

What is needed is a system or systems capable of generating a comprehensive cybersecurity score for a computer network based on a variety of heterogenous data, and making recommendations for adjusting the computer network's cybersecurity to match a level of security that appropriately balances the costs and benefits of increased or decreased cybersecurity.

SUMMARY OF THE INVENTION

Accordingly, the inventor has conceived and reduced to practice a system and method for self-adjusting cybersecurity analysis and score generation. The system and method comprise a scoring system in which a reconnaissance engine gathers data about a client's computer network from the client, from devices and systems on the client's network, and from the Internet regarding various aspects of cybersecurity. Each of these aspects is evaluated independently, weighted, and a cybersecurity score is generated by aggregating individual vulnerability and risk factors together to provide a comprehensive characterization of cybersecurity risk using a transparent and traceable methodology. Each component is then further evaluated across, or relative to, the various aspects to further evaluate, validate, and adjust the cybersecurity score. The scoring system itself can be used as a state machine with the cybersecurity score acting as a feedback mechanism, in which a cybersecurity score can be set at a level appropriate for a given organization, allowing for a balance between the costs of increasing security versus the risks of loss associated with lesser security. Data from clients or groups of clients with more extensive reporting can be extracted, generalized, and applied to clients or groups of clients with less extensive reporting to enhance cybersecurity analysis and scoring where data are suboptimal.

According to a preferred embodiment, a system for self-adjusting cybersecurity analysis and rating based on heterogeneous data and reconnaissance is disclosed, comprising: a computing device comprising a memory, a processor, and a network interface; a high volume web crawler comprising a first plurality of programming instructions stored in the memory of, and operating on the processor of, the computing device, wherein the first plurality of programming instructions, when operating on the processor, cause the computing device to obtain information from the Internet as directed by an automated planning service module; an automated planning service module, comprising a second plurality of programming instructions stored in the memory of, and operating on the processor of, the computing device, wherein the second plurality of programming instructions, when operating on the processor, cause the computing device to periodically or continuously establish a score for one or more of the following aspects of cybersecurity analysis by: defining a target network by identifying internet protocol addresses and subdomains of the target network, verifying domain name system information for each internet protocol address and subdomain of the target network, and assigning an Internet reconnaissance score; collecting domain name system leak information by identifying improper network configurations in the internet protocol addresses and subdomains of the target network, and assigning a domain name system leak information score; identifying web applications used by the target network, analyzing web applications used by the target network to identify vulnerabilities in the web applications that could allow unauthorized access to the target network, and assigning a web application security score; identifying personnel within the target network, searching social media networks for information of concern related to the personnel identified within the target network, and assigning a social network score; conducting a scan of the target network for open TCP/UDP ports, and assigning an open port score;

identifying leaked credentials associated with the target network that are found to be disclosed in previous breach incidents, and assigning a credential score; gathering version and update information for hardware and software systems within the boundary of the target network, checking version and update information for the hardware and software systems within the boundary of the target network, and assigning a patching frequency score; and identifying content of interest contained within the target network, performing an Internet search to identify references to the content of interest, and assigning an open-source intelligence score; and a cybersecurity scoring engine comprising a third plurality of programming instructions stored in the memory of, and operating on the processor of, the computing device, wherein the third plurality of programming instructions, when operating on the processor, cause the computing device to create a weighted cybersecurity score by: assigning a weight to each of the Internet reconnaissance score, the domain name system leak information score, the web application security score, the social network score, the open port score, the credential score, the patching frequency score, and the open-source intelligence score; combining the weighted scores into the weighted cybersecurity score; and a feedback engine comprising a fourth plurality of programming instructions stored in the memory of, and operating on the processor of, the computing device, wherein the fourth plurality of programming instructions, when operating on the processor, cause the computing device to: compare the weighted cybersecurity score to a score set point; recommend changes to network security to either increase or decrease network security to bring the score into equilibrium with the score set point.

According to another preferred embodiment, a method for self-adjusting cybersecurity analysis and rating based on heterogeneous data and reconnaissance is disclosed, comprising the steps of: establishing a score for one or more of the following aspects of cybersecurity analysis by: defining a target network by identifying internet protocol addresses and subdomains of the target network, verifying domain name system information for each internet protocol address and subdomain of the target network, and assigning an Internet reconnaissance score; collecting domain name system leak information by identifying improper network configurations in the internet protocol addresses and subdomains of the target network, and assigning a domain name system leak information score; identifying web applications used by the target network, analyzing web applications used by the target network to identify vulnerabilities in the web applications that could allow unauthorized access to the target network, and assigning a web application security score; identifying personnel within the target network, searching social media networks for information of concern related to the personnel identified within the target network, and assigning a social network score; conducting a scan of the target network for open TCP/UDP ports, and assigning an open port score;

identifying leaked credentials associated with the target network that are found to be disclosed in previous breach incidents, and assigning a credential score; gathering version and update information for hardware and software systems within the boundary of the target network, checking version and update information for the hardware and software systems within the boundary of the target network, and assigning a patching frequency score; and identifying content of interest contained within the target network, performing an Internet search to identify references to the content of interest, and assigning an open-source intelligence score; and creating a weighted cybersecurity score by: assigning a weight to each of the Internet reconnaissance score, the domain name system leak information score, the web application security score, the social network score, the open port score, the credential score, the patching frequency score, and the open-source intelligence score; and combining the weighted scores into the weighted cybersecurity score; comparing the weighted cybersecurity score to a score set point; recommending changes to network security to either increase or decrease network security to bring the score into equilibrium with the score set point.

According to an aspect of an embodiment, computer tasks and programs are scheduled to run at arbitrary intervals.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
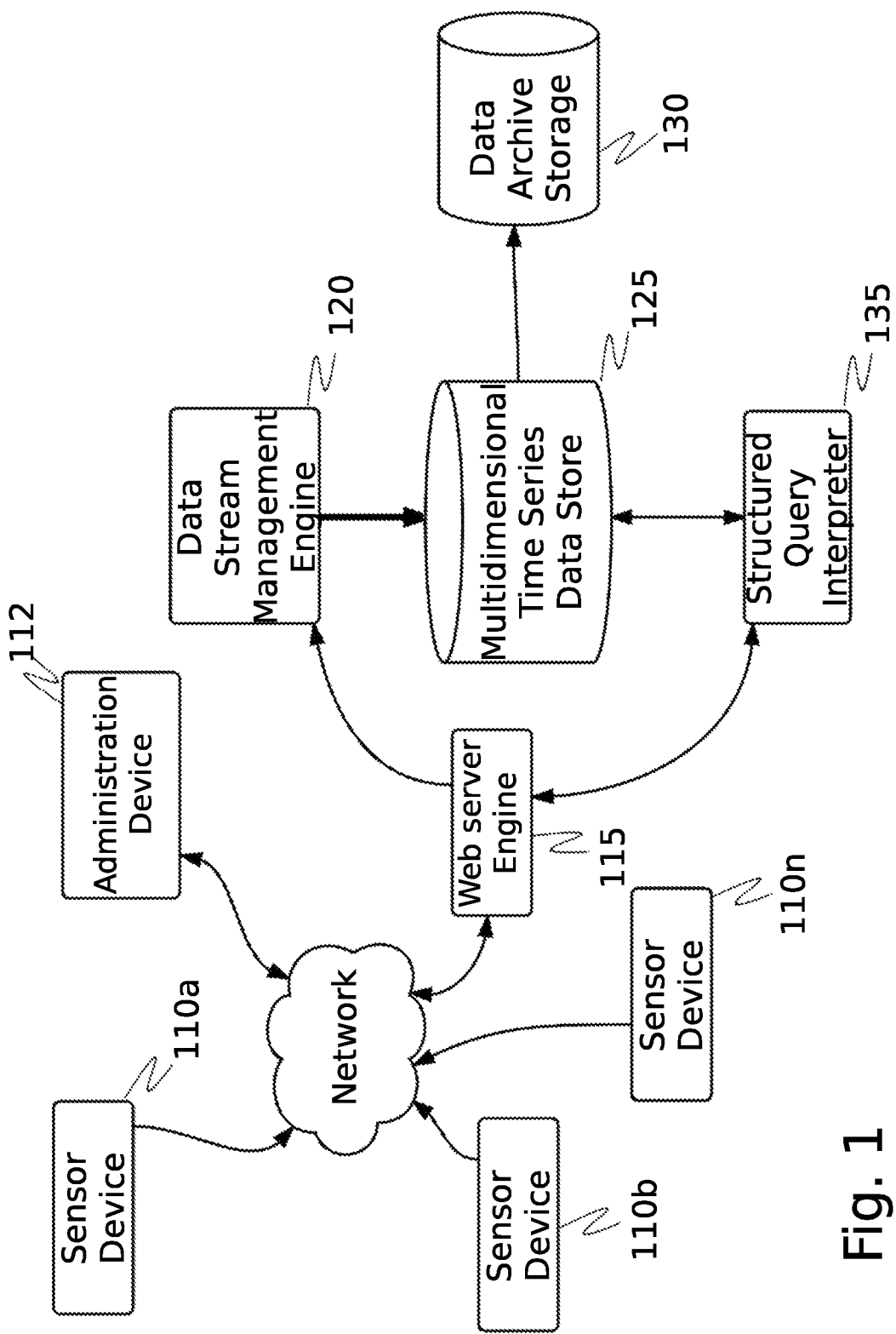
FIG. 1 is a diagram of an exemplary architecture of a system for the capture and storage of time series data from sensors with heterogeneous reporting profiles according to an embodiment of the invention.

The inventor has conceived, and reduced to practice, a system and method for self-adjusting cybersecurity analysis and score generation. The system and method comprise a scoring system in which a reconnaissance engine gathers data about a client's computer network from the client, from devices and systems on the client's network, and from the Internet regarding various aspects of cybersecurity. Each of these aspects is evaluated independently, weighted, and a cybersecurity score is generated. Each component is then further evaluated across, or relative to, the various aspects to further evaluate, validate, and adjust the cybersecurity score. The scoring system itself can be used as a state machine with the cybersecurity score acting as a feedback mechanism, in which a cybersecurity score can be set at a level appropriate for a given organization, allowing for a balance between the costs of increasing security versus the risks of loss associated with lesser security. Data from clients or groups of clients with more extensive reporting can be extracted, generalized, and applied to clients or groups of clients with less extensive reporting to enhance cybersecurity analysis and scoring where data are sub-optimal.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 (PRIOR ART) is a diagram of an exemplary architecture of a system for the capture and storage of time series data from sensors with heterogeneous reporting profiles according to an embodiment of the invention 100. In this embodiment, a plurality of sensor devices 110*a-n* stream data to a collection device, in this case a web server acting as a network gateway 115. These sensors 110*a-n* can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Risk, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
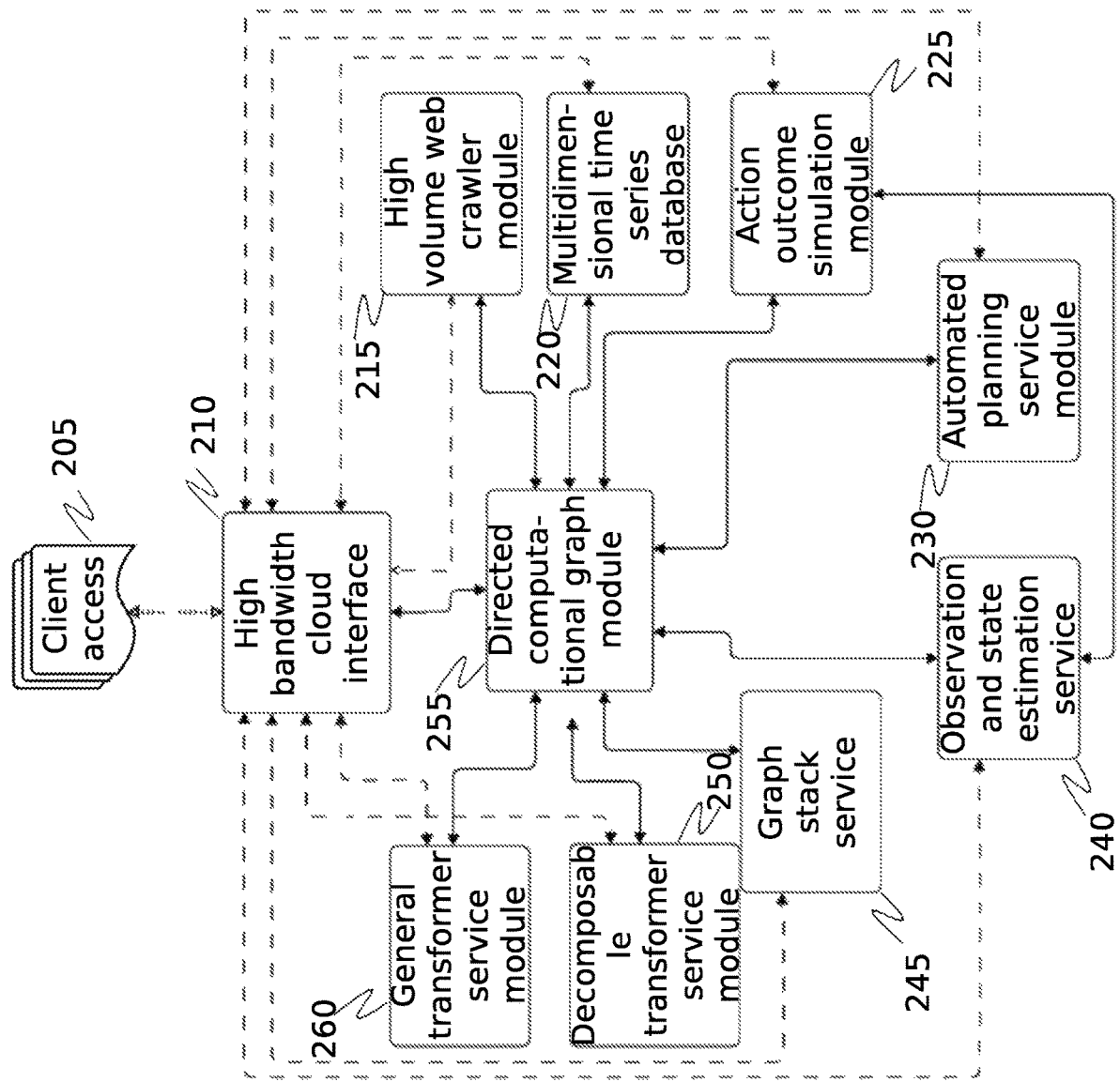
FIG. 2 is a diagram of an exemplary architecture of a business operating system according to an embodiment of the invention.

FIG. 2 (PRIOR ART) is a diagram of an exemplary architecture of a business operating system 200 according to an embodiment of the invention. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web based sources that are not well tagged by conventional web crawling technology. Multiple dimension time series database module 220 receives data from a large plurality of sensors that may be of several different types. The module is designed to accommodate irregular and high volume surges by dynamically allotting network bandwidth and server processing channels to process the incoming data. Data retrieved by the multidimensional time series database 220 and the high volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible business decisions. Using all available data, the automated planning service module 230 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 3:
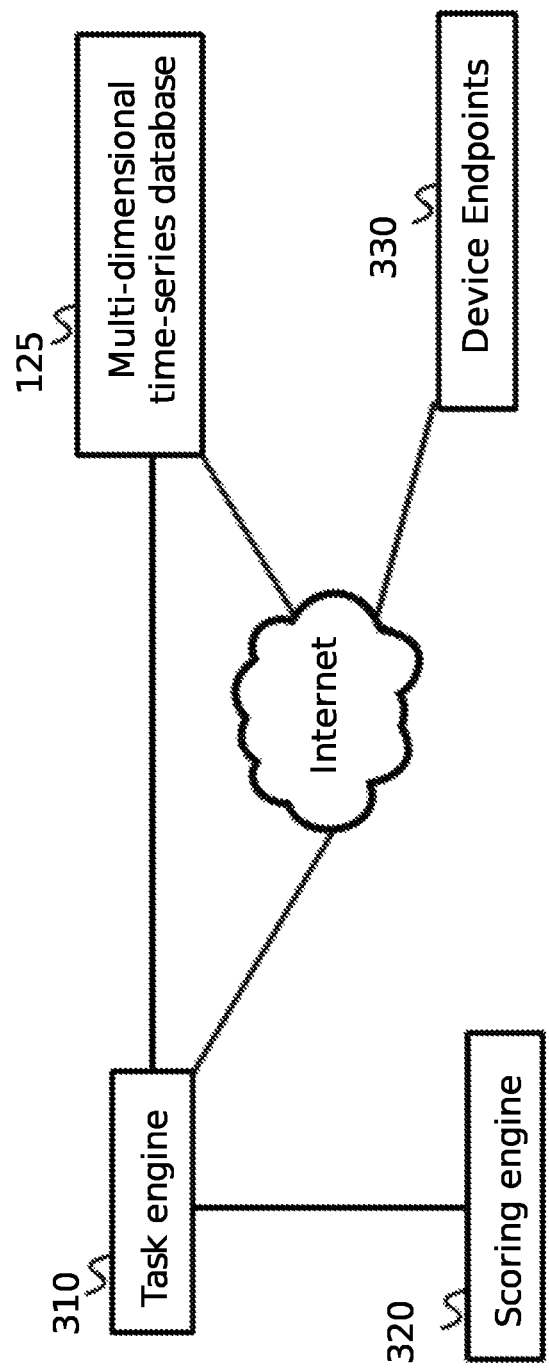
FIG. 3 is a diagram of an exemplary architecture of a cybersecurity analysis system according to an embodiment of the invention.

FIG. 3 is a system diagram, illustrating the connections between crucial components, according to an aspect of the invention. Core components include a scheduling task engine 310 which will run any processes and continue with any steps desired by the client, as described in further methods and diagrams in the disclosure. Tasks may be scheduled to run at specific times, or run for certain given amounts of time, which is commonplace for task scheduling software and systems in the art. This task engine 310 is then connected to the internet, and possibly to a single or plurality of local Multi-Dimensional Time-Series Databases (MDTSDB) 125. It is also possible to be connected to remotely hosted and controlled MDTSDB's 125 through the Internet, the physical location or proximity of the MDTSDB for this disclosure not being a limiting factor. In such cases as the MDTSDB 125 is not hosted locally, it must also maintain a connection to the Internet or another form of network for communication with the task engine 310. Device endpoints 330, especially Internet-of-Things (IoT) devices, are also by definition connected to the internet, and in methods described in later figures will be used for cybersecurity analysis and risk assessment. The task engine 310 which will perform the scheduling and running of the methods described herein also maintains a connection to the scoring engine 320, which will be used to evaluate data gathered from the analysis and reconnaissance tasks run by the task scheduling engine 310.

Figure 4:
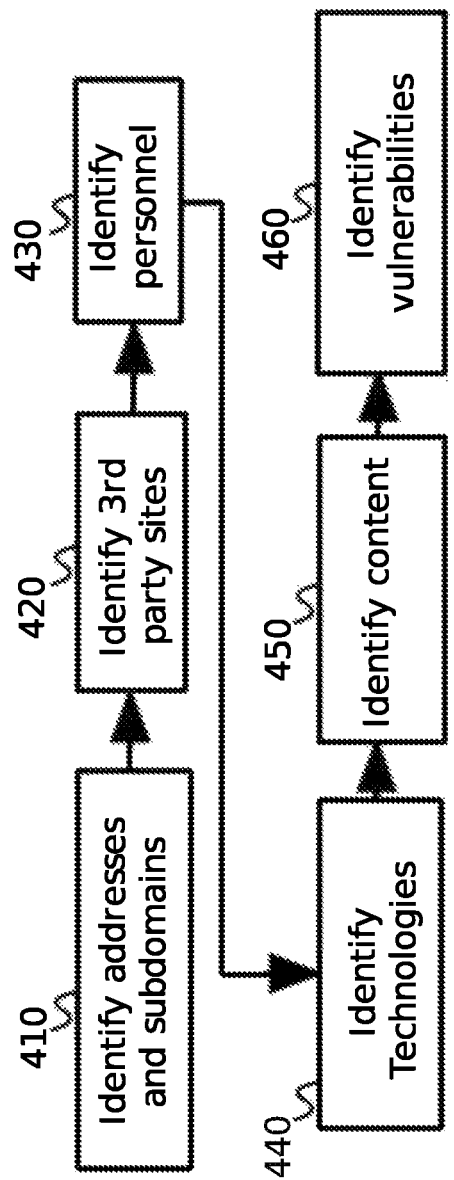
FIG. 4 is a method diagram illustrating key steps in passive cyber reconnaissance activities, according to an aspect.

FIG. 4 is a method diagram illustrating basic reconnaissance activities to establish network information for any given client. A first activity in establishing network boundaries and information is to identify Internet Protocol ("IP") addresses and subdomains 410 of the target network, to establish a scope for the remainder of activities directed at the network. Once you have established network "boundaries" by probing and identifying the target IP addresses and subdomains 410, one can probe for and establish what relationships between the target and third-party or external websites and networks exist 420, if any. It is especially important to examine trust relationships and/or authoritative DNS record resolvers that resolve to external sites and/or networks. A next key step, according to an aspect, is to identify personnel involved with the target network, such as names, email addresses, phone numbers, and other personal information 430, which can be useful for social engineering activities, including illegal activities such as blackmail in extreme cases. After identifying personnel affiliated with the target network, another process in the method, according to an aspect, could be to identify versions and other information about systems, tools, and software applications in use by the target organization 440. This may be accomplished in a variety of ways, whether by examining web pages or database entries if publicly accessible, or by scraping information from the web about job descriptions associated with the organization or similar organizations—other methods to attain this information exist and may be used however. Another process in the method, according to an aspect, may be to identify content of interest 450 associated with the target, such as web and email portals, log files, backup or archived files, or sensitive information contained within Hypertext Markup Language ("HTML") comments or client-side scripts, such as ADOBE FLASH™ scripts for example. Using the gathered information and other publicly available information (including information which will be gathered in techniques illustrated in other figures), it is possible and critical to then identify vulnerabilities 460 from this available data, which can be exploited.

Figure 5:
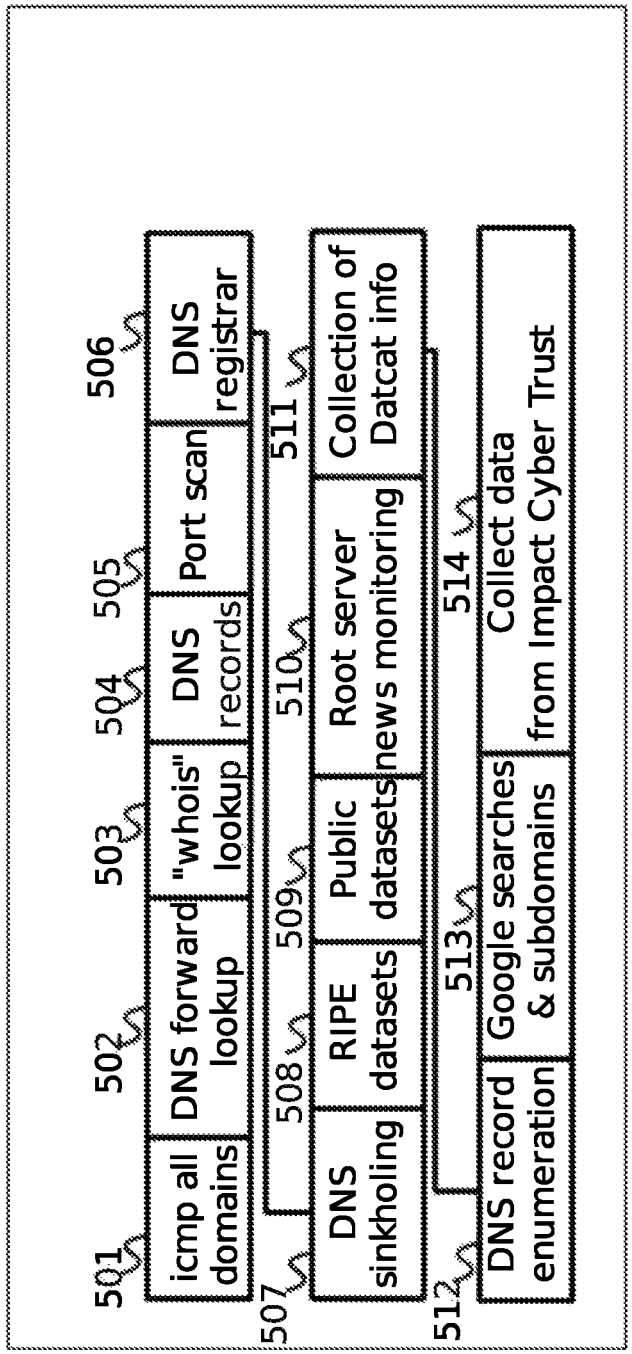
FIG. 5 is a method diagram illustrating activities and key steps in network and internet active reconnaissance, according to an aspect.

FIG. 5 is a method diagram illustrating and describing many activities and steps for network and internet based reconnaissance for cybersecurity purposes. The first step, according to an aspect, would be to use Internet Control Message Protocol (ICMP) to resolve what IP address each domain of the target resolves as 501. According to an aspect, another process in the method would be to perform a DNS forward lookup 502, using the list of subdomains of the target as input, generating a list of IP addresses as output. It is then possible to see if the IP addresses returned are within the net ranges discovered by a whois—which is a protocol used for querying databases for information related to assignees of an internet resource, including an IP address block, or domain name—check of the target's domain 503, and if not, perform additional whois lookups to determine if new associated net ranges are of interest, and then you may run a reverse DNS Lookup to determine the domains to which those addresses belong. A second use for whois lookups 503 is to determine where the site is hosted, and with what service—for example in the cloud, with Amazon Web Services, Cloudflare, or hosted by the target corporation itself. The next overall step in the process, according to an aspect, is to examine DNS records 504, with reverse IP lookups, and using certain tools such as dnscheck.ripe.net it is possible to see if other organizations share hosting space with the target. Other DNS record checks 504 include checking the Mail Exchange ("MX") record, for the Sender Policy Framework ("SPF") to determine if the domain is protected against emails from unauthorized domains, known commonly as phishing or spam, and other forms of email attack. Further examining the DNS MX record 504 allows one to examine if the target is self-hosting their email or if it is hosted in the cloud by another service, such as, for example, Google. DNS text records 504 may also be gathered for additional information, as defined by an aspect. The next overall step in the process is to conduct a port scan on the target network 505 to identify open TCP/UDP ports, and of any devices immediately recognizable, to find insecure or open ports on target IP addresses. Multiple tools for this exist, or may be constructed. Next, collecting the identity of the target's DNS registrar 506 should be done, to determine more information about their hosting practices. Another action in the method, according to an aspect, is to leverage the technology and technique of DNS sinkholing 507, a situation where a DNS server is set up to spread false information to clients that query information from it. For these purposes, the DNS sinkhole 507 may be used to redirect attackers from examining or connecting to certain target IP addresses and domains, or it can be set up as a DNS proxy for a customer in an initial profiling phase. There are possible future uses for DNS sinkholes 507 in the overall cybersecurity space, such as potentially, for example, allowing a customer to route their own requests through their own DNS server for increased security. The next overall step in network and internet reconnaissance, according to an aspect, is to use Réseaux IP Européens ("RIPE") datasets 508 for analytics, as seen from www.ripe.net/analyse/raw-data-sets which comprises: RIPE Atlas Raw Data, RIS Raw Data, Reverse DNS Delegations, IPv6 Web Statistics, RIPE NCC Active Measurements Of World IPv6 Day Dataset, RIPE NCC Active Measurements of World IPv6 Launch Dataset, iPlane traceroute Dataset, NLANR AMP Data, NLANR PMA Data, and WITS Passive Datasets. Another process in the method, according to an aspect, is to collect information from other public datasets 509 from scanning projects produced by academia and the government, including scans.io, and ant.isi.edu/datasets/all.html. These projects, and others, provide valuable data about the internet, about publicly accessible networks, and more, which may be acquired independently or not, but is provided for the public regardless to use for research purposes, such as cybersecurity evaluations. Another action in the method, according to an aspect, is to monitor the news events from the root server 510, for anomalies and important data which may be relevant to the security of the server. Another process in the method, according to an aspect, is to collect data from DatCat 511, an internet measurement data catalogue, which publicly makes available measurement data gathered from various scans of the internet, for research purposes. Another process in the method, according to an aspect, is to enumerate DNS records 512 from many groups which host website traffic, including Cloudflare, Akamai, and others, using methods and tools already publicly available on websites such as github. Technologies such as DNSRecon and DNSEnum exist for this purpose as well, as recommended by Akamai. Another action in the method, according to an aspect, is to collect and crawl Google search results 513 in an effort to build a profile for the target corporation or group, including finding any subdomains still not found. There is an entire category of exploit with Google searches that exploits the Google search technique and may allow access to some servers and web assets, such as exploits found at www.exploit-db.com/google-hacking-database and other exploits found online which may be used to help assess a target's security. It is important to see if the target is vulnerable to any of these exploits. Another action in the method, according to an aspect, is to collect information from Impact Cyber Trust 514, which possesses an index of data from many internet providers and may be useful for analyzing and probing certain networks.

Figure 6:
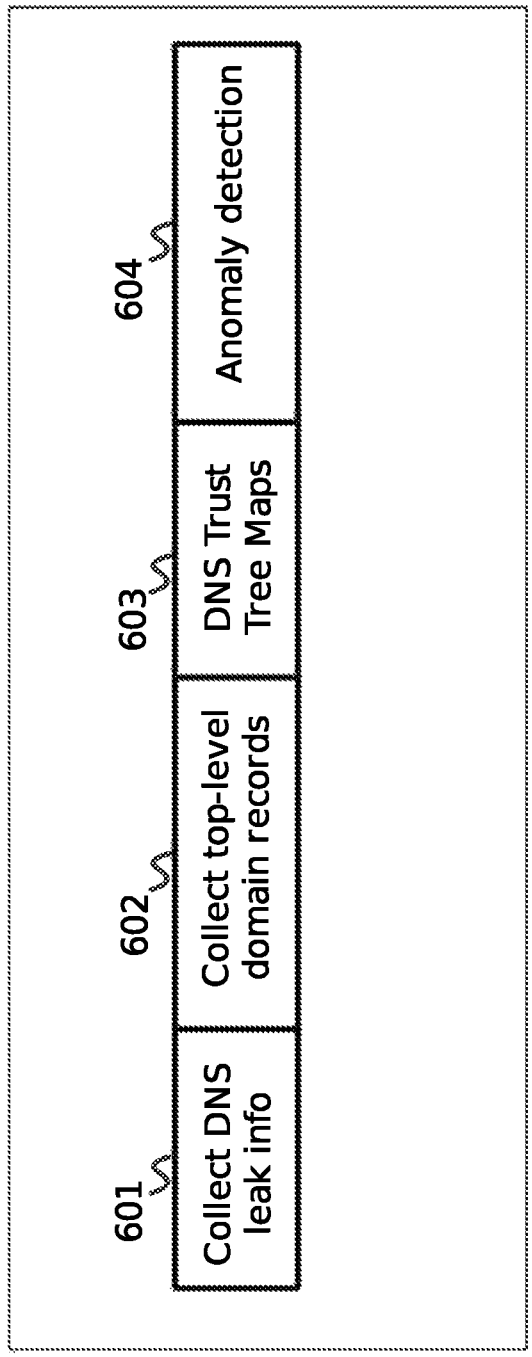
FIG. 6 is a method diagram illustrating activities and key steps in gathering leaked Domain Name Serve ("DNS") information for reconnaissance and control purposes, according to an aspect.

FIG. 6 is a method diagram illustrating key steps in collection of DNS leak information. A first step in this process would be, according to an aspect, to collect periodic disclosures of DNS leak information 601, whereby a user's privacy is insecure because of improper network configuration. A second step, according to an aspect, is to top-level domain records and information about top-level domain record health 602, such as reported by open-source projects available on websites such as Github. Another process in the method is to create a Trust Tree map 603 of the target domain, which is an open-source project available on Github Github.com/mandatoryprogrammer/TrustTrees) but other implementations may be used of the same general process. A Trust Tree in this context is a graph generated by following all possible delegation paths for the target domain and generating the relationships between nameservers it comes across. This Trust Tree will output its data to a Graphstack Multidimensional Time-Series Database ("MDTSDB"), which grants the ability to record data at different times so as to properly understand changing data and behaviors of these records. The next step in this process is anomaly detection 604 within the Tree Trust graphs, using algorithms to detect if new references are being created in records (possible because of the use of MDTSDB's recording data over time), which may help with alerting one to numerous vulnerabilities that may be exploited, such as if a top level domain is hijacked through DNS record manipulation, and other uses are possible.

Figure 7:
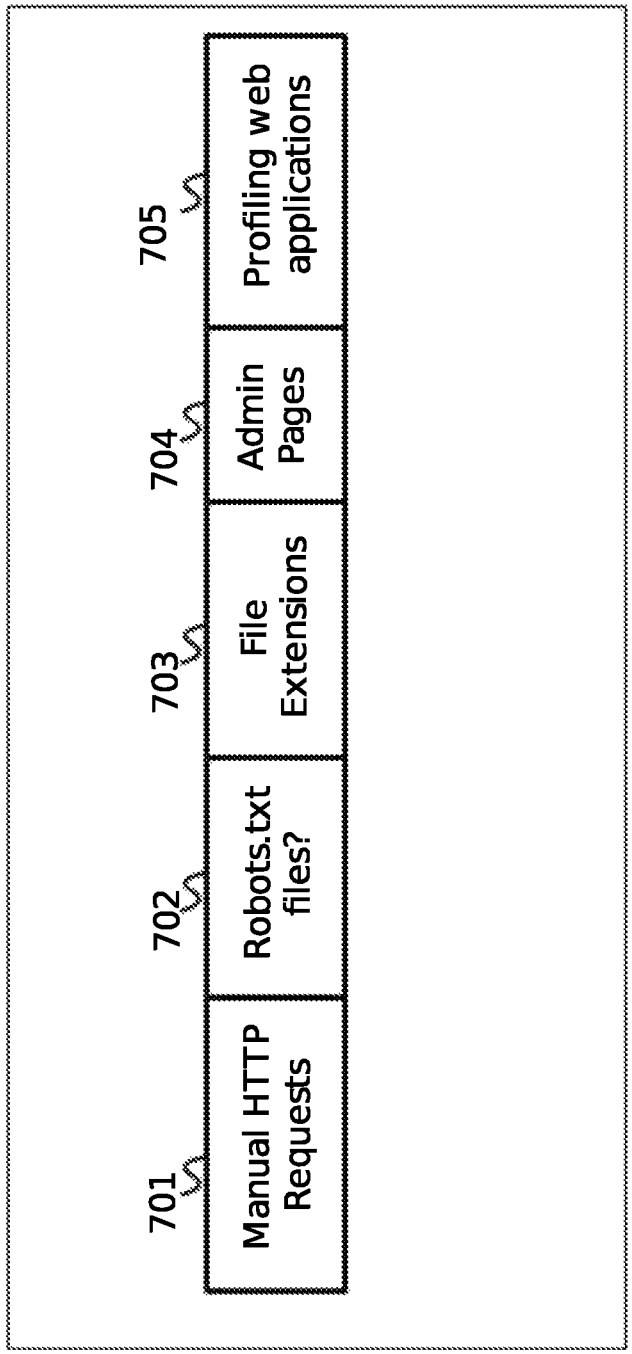
FIG. 7 is a method diagram illustrating activities and key steps in gathering information on web applications and technologies through active reconnaissance, according to an aspect.

FIG. 7 is a method diagram illustrating numerous actions and steps to take for web application reconnaissance. A first step, according to an aspect, is to make manual Hypertext Transfer Protocol ("HTTP") requests 701, known as HTTP/1.1 requests. Questions that are useful for network reconnaissance on the target that may be answered include whether the web server announces itself, and version number returned by the server, how often the version number changes which often indicates patches or technology updates, as examples of data possibly returned by such a request. A second step in the process is to look for a robots.txt file 702, a common type of file used to provide metadata to search engines and web crawlers of many types (including Google). This allows, among other possible things, to possibly determine what content management system (if any) the target may be using, such as Blogger by Google, or the website creation service Wix. Another process in the method for intelligence gathering on the target, is to fingerprint the application layer by looking at file extensions 703, HTML source, and server response headers, to determine what methods and technologies are used to construct the application layer. Another step is to examine and look for /admin pages 704 that are accessible and open to the public internet, which may be a major security concern for many websites and web-enabled technologies. The next step in this category of reconnaissance is to profile the web application of the target based on the specific toolset it was constructed with 705, for example, relevant information might be the WORDPRESS™ version and plugins they use if applicable, what version of ASP.NET™ used if applicable, and more. One can identify technologies from the target from many sources, including file extensions, server responses to various requests, job postings found online, directory listings, login splash pages (many services used to create websites and web applications have common templates used by many users for example), the content of a website, and more. Profiling such technology is useful in determining if they are using outdated or vulnerable technology, or for determining what manner of attacks are likely or targeted towards their specific technologies and platforms.

Figure 8:
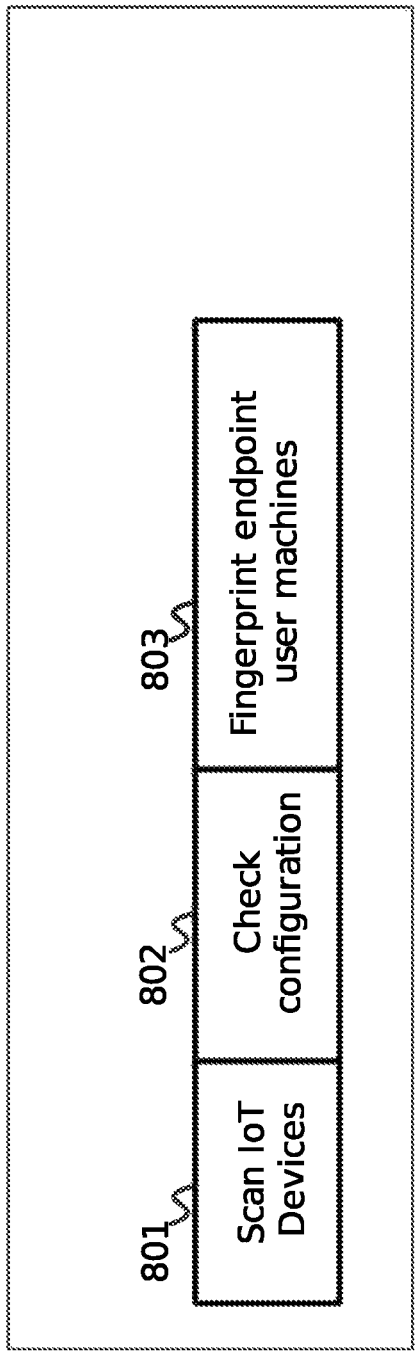
FIG. 8 is a method diagram illustrating activities and key steps in reconnaissance and information gathering on Internet-of-Things ("IOT") devices and other device endpoints, according to an aspect.

FIG. 8 is a method diagram illustrating steps to take for scanning the target for Internet Of Things (IoT) devices and other user device endpoints. The first step, according to an aspect, is to scan the target network for IoT devices 801, recognizable often by data returned upon scanning them. Another process in the method, according to an aspect, is to check IoT devices reached to see if they are using default factory-set credentials and configurations 802, the ability to do this being available in open-source scanners such as on the website Github. Default settings and/or credentials for devices in many times may be exploited. The next step, according to an aspect, is to establish fingerprints for user endpoint devices 803, meaning to establish identities and information about the devices connected over Transmission Control Protocol/Internet Protocol ("TCP/IP") that are often used by users such as laptops or tablets, and other devices that are internet access endpoints. It is important to establish versions of technology used by these devices when fingerprinting them, to notice and record changes in the MDTSDB in future scans.

Figure 9:
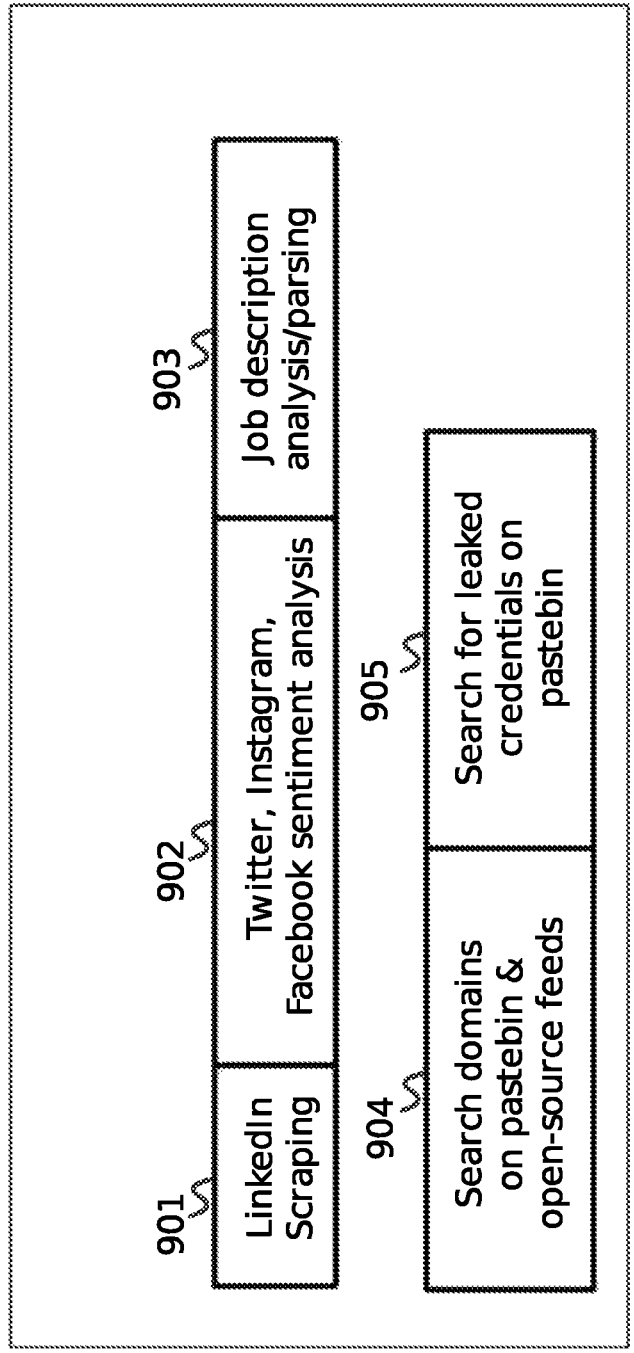
FIG. 9 is a method diagram illustrating activities and key steps in gathering intelligence through reconnaissance of social network and open-source intelligence feeds ("OSINT"), according to an aspect.

FIG. 9 is a method diagram illustrating steps and actions to take to gather information on, and perform reconnaissance on, social networks and open-source intelligence feeds (OSINT). A first step is to scrape the professional social network LinkedIn 901 for useful information, including job affiliations, corporate affiliations, affiliations between educational universities, and more, to establish links between many actors which may be relevant to the security of the target. A second step to take, according to an aspect, is to perform a sentiment analysis on the popular social networks Instagram, Facebook, and Twitter 902. A sentiment analysis may, with proper technology and precision, provide information on potential attackers and agents which may be important to the security of the target, as well as establishing a time-series graph of behavioral changes which may affect the environment of the cybersecurity of the target. Another process in the method, according to an aspect, is to perform a job description analysis/parse 903, from the combination of social networks reviewed, so as to identify multiple pieces of relevant information for the target—such as known technologies used by the target, and possible actors that may be relevant to the target's cybersecurity. More than this, it is also possible that one can find information on actors related to the target that may be used against the target, for example in cases of industrial espionage. Other uses for such information exist relevant to the field of the invention, as in most cases of reconnaissance mentioned thus far. Another process in the method, according to an aspect, is to search domains on Pastebin and other open-source feeds 904. Finding useful information such as personal identifying information, domains of websites, and other hidden information or not-easily-obtained information on public sources such as Pastebin, is of incredible use for cybersecurity purposes. Such feeds and sources of public information are known as OSINT and are known to the field. Other information scrapable from Pastebin includes credentials to applications, websites, services, and more 905, which must be scraped and identified in order to properly mitigate such security concerns. Of particular importance is the identification of leaked credentials, specific to a target domain, that are found to be disclosed in previous breach incidents using open internet/dark web breach collection tools 905.

Figure 10:
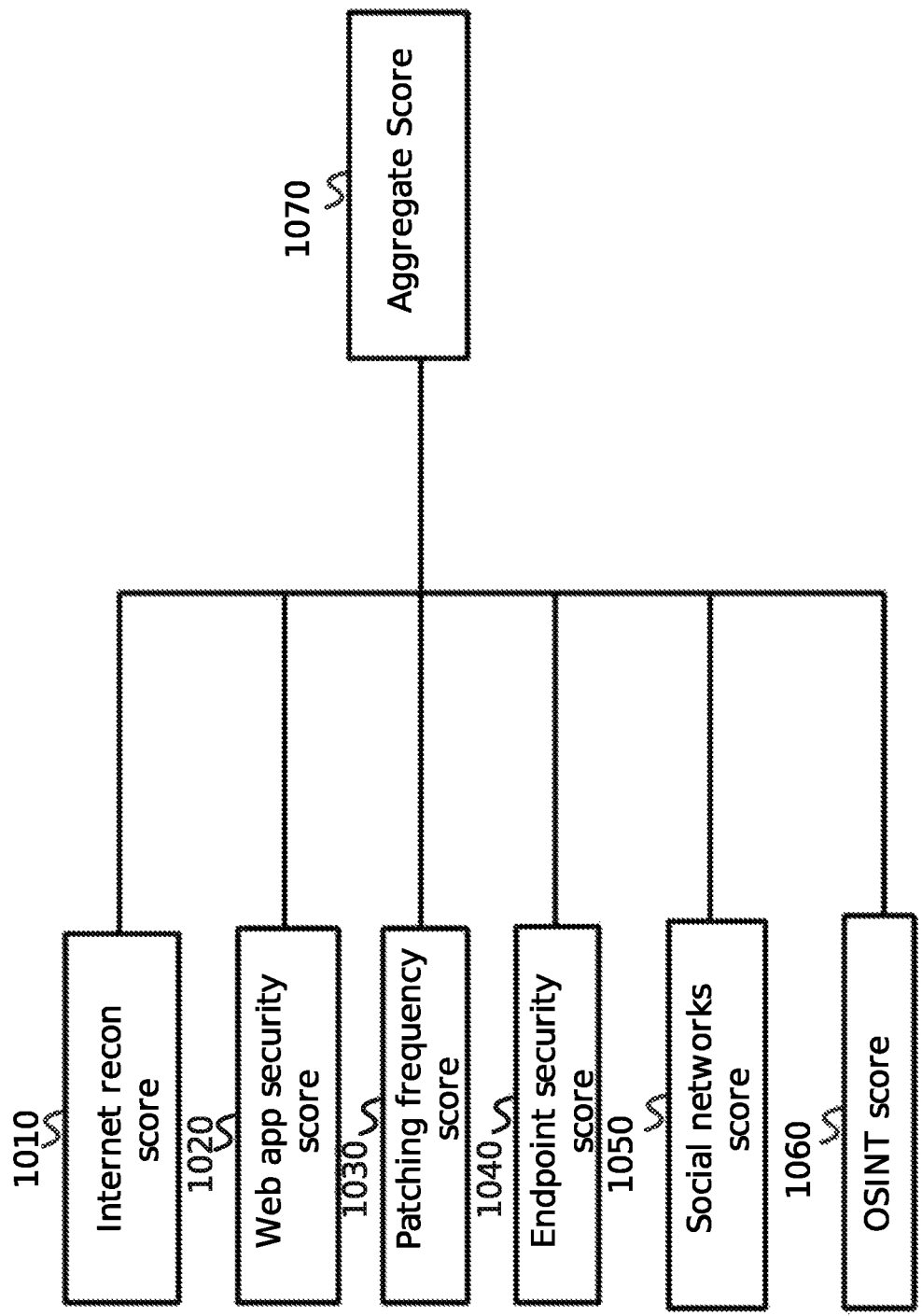
FIG. 10 is a method diagram illustrating the congregation of information from previous methods into a comprehensive cybersecurity score, using a scoring engine, according to an aspect.

FIG. 10 illustrates a basic system for congregating information from several previous methodologies into a comprehensive cybersecurity score of the analyzed target/customer. It is important to note that this scoring only aggregates information and thus scores the security of the target based on externally visible data sets. Once complete and comprehensive reconnaissance has been performed, all information from the internet reconnaissance 1010, FIG. 2, web application security 1020, FIG. 7, patching frequency of the target websites and technologies 1030, FIG. 7, Endpoint and IoT security 1040, FIG. 8, social network security and sentiment analysis results 1050, FIG. 9, and OSINT reconnaissance results 1060, FIG. 9. All of these sources of information are gathered and aggregated into a score, similar to a credit score, for cybersecurity 1070, the scoring method of which may be changed, fine-tuned, and otherwise altered either to suit customer needs or to suit the evolving field of technologies and information relevant to cybersecurity. This score represents the sum total of security from the reconnaissance performed, as far as externally visible data is concerned, a higher score indicating higher security, from a range of 250 to 850. Up to 400 points may be accrued for internet security 1010, up to 200 points may be accrued for web application security 1020, 100 points may be gained for a satisfactory patching frequency of technologies 1030, and all remaining factors 1040, 1050, 1060 of the score may award up to 50 points for the target, if perfectly secure.

Figure 11:
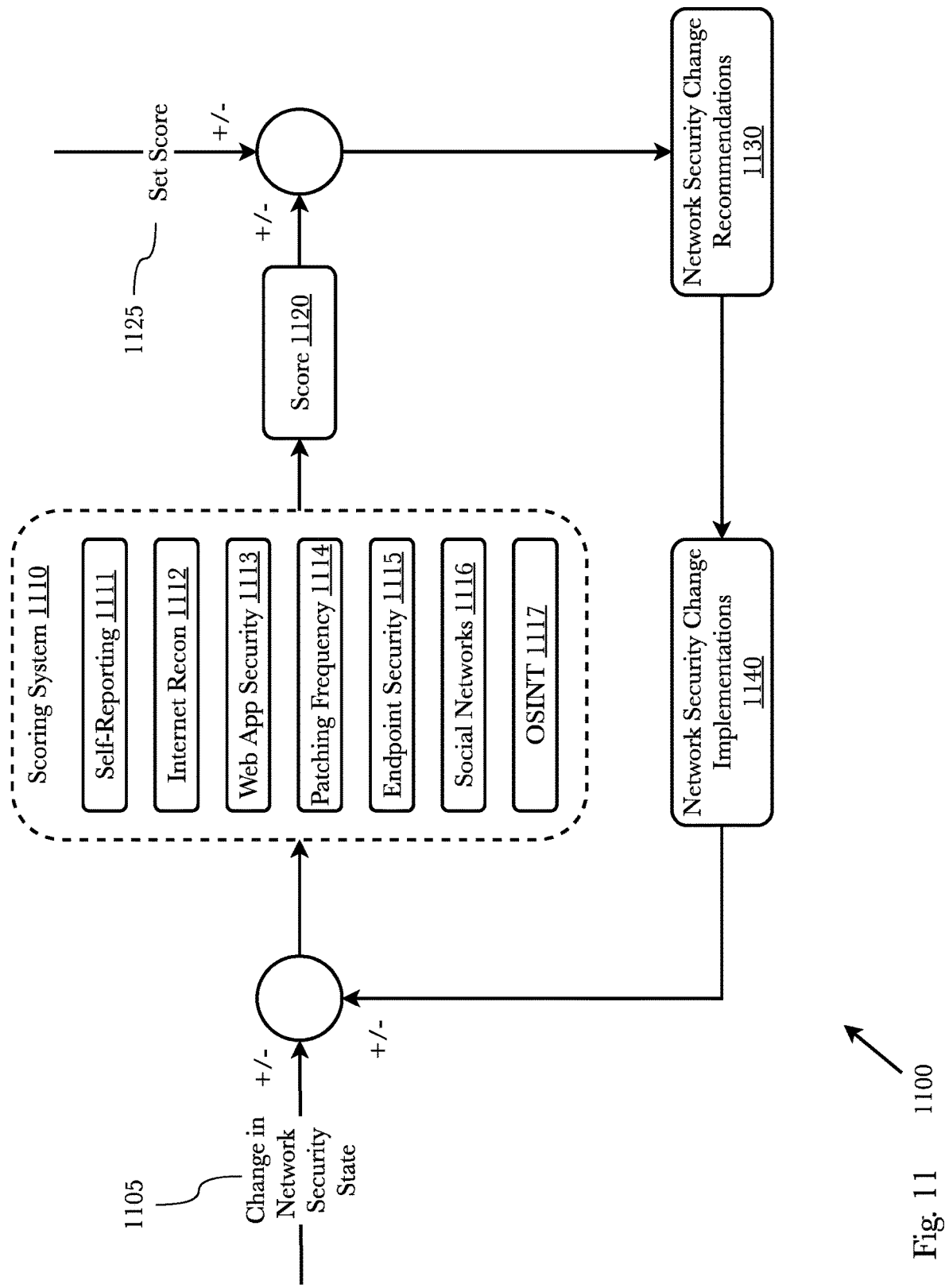
FIG. 11 is diagram illustrating how the scoring system can be used as a feedback loop to establish and maintain a level of security appropriate to a given organization.

FIG. 11 is diagram illustrating how the scoring system can be used as a feedback loop 1100 to establish and maintain a level of security appropriate to a given organization. This feedback loop is similar in function to feedbacks for control systems, and may be implemented in software, hardware, or a combination of the two, and aspects of the control system may be automatically or manually implemented. A scoring system 1110 can be represented as a system comprising subsystems for various aspects of cybersecurity scoring, i.e., self-reporting/self-attestation 1111, internet reconnaissance 1112, web application security 1113, software/firmware updates and patching frequency 1114, endpoint security 1115, social networks 1116, and open source intelligence (OSINT) 1117. Each subsystem representing an aspect of cybersecurity may analyze data gathered for that aspect and generate its own score related to that aspect. The scores from each subsystem may be combined in some fashion to arrive at an overall cybersecurity score 1120 for a given computer system or computer network. This combination may take any number of forms, for example, summation, averaging, weighted averaging, or any other appropriate algorithm or methodology for creating a single score from multiple scores. The overall cybersecurity score 1120 is compared against a score setting 1125, which may be set automatically by the system based on certain parameters, or may be set manually by a user of the system knowledgeable about the organization's infrastructure, risk tolerance, resources, etc. Based on the comparison, network security changes 1130 are recommended, including a recommendation for no change where the overall cybersecurity score 1120 is at or close to the score setting. Where the score 1120 is above or below the set score 1125, changes to network security may be implemented 1140, either automatically or manually, to loosen or tighten network security to bring the score 1120 back into equilibrium with the set score 1125. A change to any one of the aspects of cybersecurity 1111-1117 would constitute a change in the network security state 1105 which, similar to control systems, would act as an input disturbance to the system and propagate through the feedback loop until equilibrium between the score 1120 and set score 1125 is again achieved.

As in control systems, the feedback loop may be dynamically adjusted in order to cause the overall cybersecurity score 1120 to come into equilibrium with the set score 1125, and various methods of accelerating or decelerating network security changes may be used. As one example, a proportional-integral-derivative (PID) controller or a state-space controller may be implemented to predictively reduce the error between the score 1120 and the set score 1125 to establish equilibrium. Increases in the magnitude of the error, accelerations in change of the error, and increases in the time that the error remains outside of a given range will all lead to in corresponding increases in tightening of network security (and vice-versa) to bring the overall cybersecurity score 1120 back in to equilibrium with the set score 1125.

Figure 12:
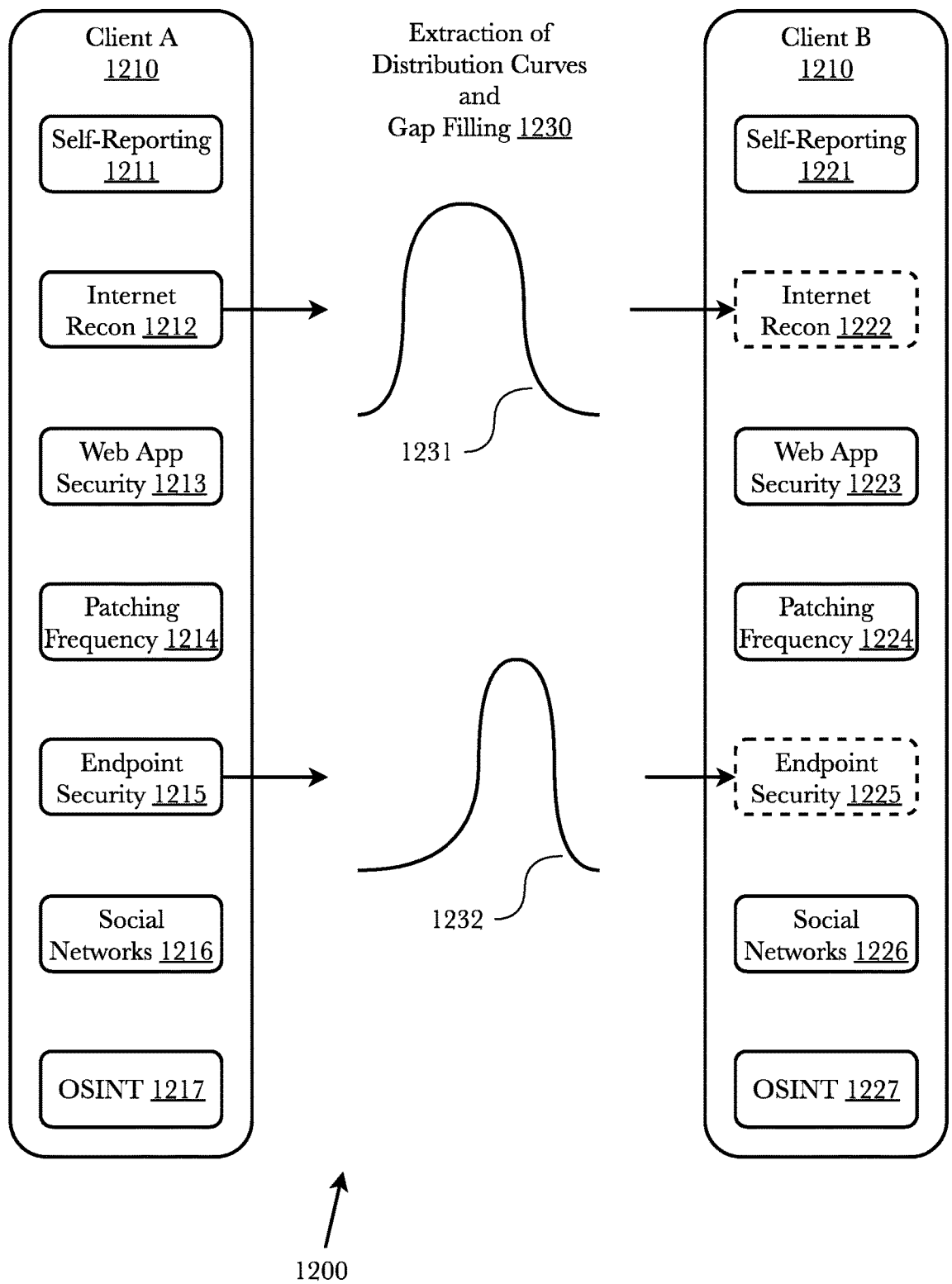
FIG. 12 is diagram illustrating the use of data from one client to fill gaps in data for another client to improve cybersecurity analysis and scoring.

FIG. 12 is diagram illustrating the use of data from one client to fill gaps in data for another client 1200 to improve cybersecurity analysis and scoring. In any given group of organizations, some organizations will have a more complete set of data regarding some aspects of cybersecurity analysis and scoring than other organizations. For example, large corporate clients will have extensive network security logs, a large Internet profile, frequently patched and updated systems, and a large staff of IT professionals to self-report data. Smaller clients and individuals will have little or none of those characteristics, and therefore a much smaller set of data on which to base cybersecurity analyses, recommendations, and scoring. However, generalized data and trends from larger and/or more "data rich" organizations can be used to fill in gaps in data for smaller and/or more "data poor" organizations. In this example, Client A 1210 is a large organization with an extensive Internet presence and a large staff of IT professionals. Thus, the Internet reconnaissance data 1212 for Client A 1210 will contain a broad spectrum of data regarding the organization's online presence and vulnerabilities of that and similar organizations, and the social network data 1226 of Client A will contain a rich set of data for many employees and their usage of social media. Client A's 1210 self-reporting 1211 and other aspects of cybersecurity analysis 1212-1217 are likely to contain much more detailed data than a smaller organization with fewer resources. Client B 1220, on the other hand, is a much smaller organization with no dedicated IT staff. Client B 1220 will have a much smaller Internet presence, possibly resulting in Internet reconnaissance data 1222 containing little or no information available other than whois and DNS records. Client B 1220 is also unlikely to have any substantial social network data 1226, especially where Client B 1220 does not require disclosure of social media usage. Client B's 1220 self-reporting data 1221 and other aspects 1222-1227 are also likely to contain substantially less data, although in this example it is assumed that Client B's 1220 self-reporting data 1221, web app security data 1223, version, update, and patching frequency data 1224, endpoint security 1225, social network data 1226, and OSINT data 1227 are sufficient for cybersecurity analysis.

Extraction of data (e.g., distribution curves) and gap filling 1230 may be used to fill in missing or insufficient data in order to perform more accurate or complete analyses. The distribution, trends, and other aspects 1231 of Client B's 1220 Internet reconnaissance data 1212 and the distribution, trends, and other aspects 1232 of Client B's 1220 social network data 1212 may be extracted and use to fill gaps in Client A's 1210 Internet reconnaissance data 1222 and social network data 1226 to improve cybersecurity analyses for Client A 1210 without requiring changes in Client A's 1210 infrastructure or operations. In some embodiments, synthetic data will be generated from the distributions, trends, and other aspects to use as gap-filling data in a format more consistent with the data for Client A 1210. While a single Client A 1210 and Client B 1220 are shown for purposes of simplicity, this process may be expanded to any number of clients with greater data representation and any number of clients with lesser data representation.

Figure 13:
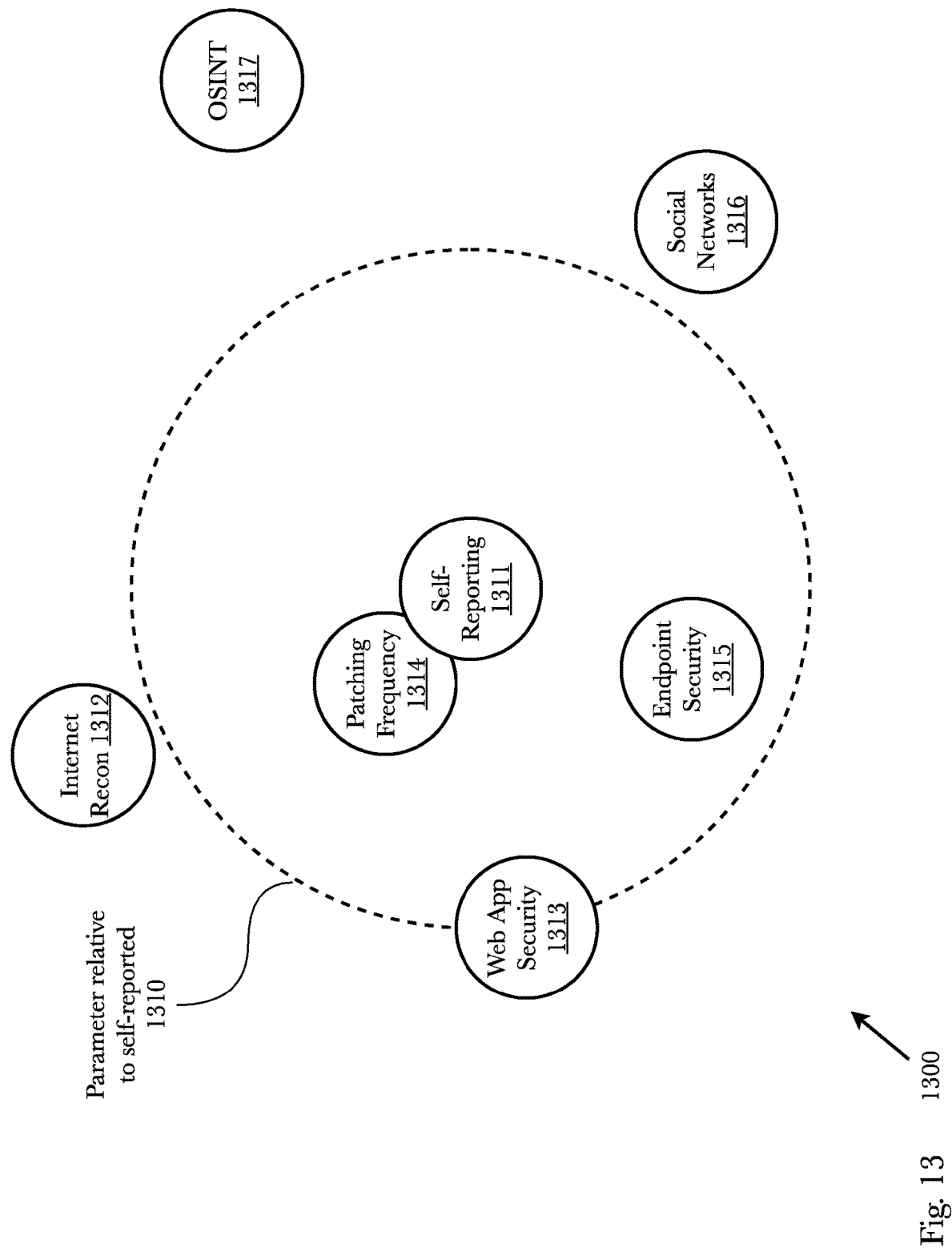
FIG. 13 is a diagram illustrating cross-referencing and validation of data across different aspects of a cybersecurity analysis.

FIG. 13 is a diagram illustrating cross-referencing and validation of data across different aspects of a cybersecurity analysis 1300. For any given parameter, cross-referencing and validation may be performed across data sets representing various aspects of cybersecurity analysis. In this example, a certain parameter 1310 (e.g., number of security breaches in a given area or aspect) is selected from self-reported data 1311, and compared against the same or a similar parameter for other data sets representing aspects of cybersecurity analysis 1312-1317. A range or threshold may be established for the parameter 1310, as represented by the dashed line. The relative distance from the self-reported data 1311 may be calculated, and aspects of cybersecurity falling outside of the range or threshold may be identified. In this example, for instance, versions, updates, and patching frequency 1314 are relatively close to the self-reported data 1311, and fall within the threshold established for the parameter 1310. Endpoint security 1315 and web app security 1313 are further from the self-reported value 1311, but still within the range or threshold of the parameter 1310. However, the values for Internet reconnaissance 1312, social networks 1316, and OSINT 1317 fall outside of the range or threshold of the parameter 1310, and therefore warrant further action. The action may be, for example, re-assessing the scores associated with patching frequency 1314, endpoint security 1315, and social networks 1316 to ensure that the data for those aspects is consistent and/or valid, or other measures designed to improve scoring accuracy and consistency.

Figure 14:
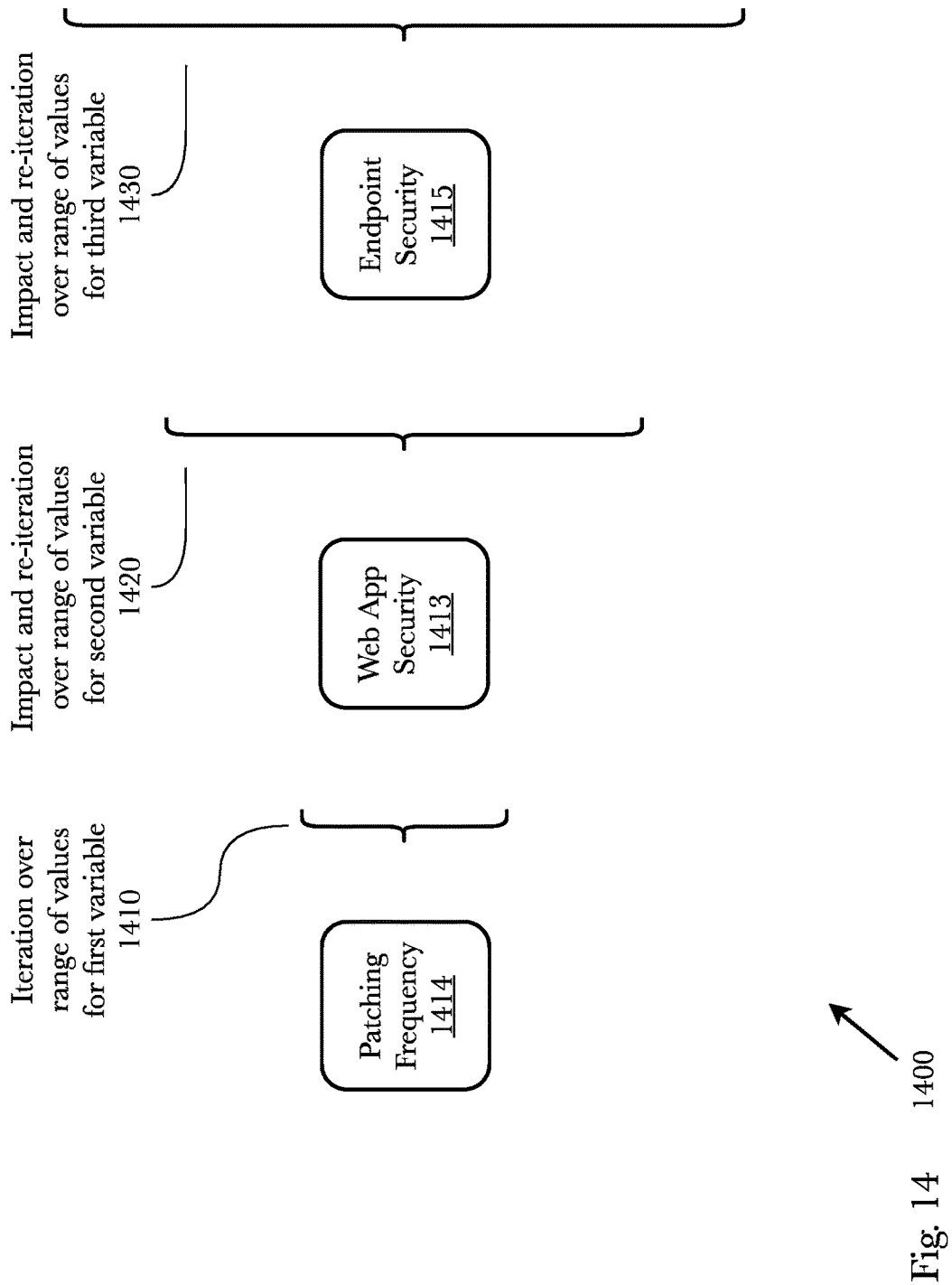
FIG. 14 is a diagram illustrating parametric analysis of an aspect of cybersecurity analysis.

FIG. 14 is a diagram illustrating parametric analysis of an aspect of cybersecurity analysis 1400. Parametric analysis is the process of iterating an analysis over a range of values of a parameter to see how the different values of the parameter affect the overall system in which the parameter is used. In this example, patching frequency 1414 is used as the parameter with the range of value 1410 ranging, for example, from none to daily. As the patching frequency 1414 parameter is iterated over the range of values 1410, its impact is evaluated on web app security 1413, which is likely to have a broader impact and range of values 1420 which, in turn, will have knock-on impacts and a likely broader range of values 1430 for endpoint security 1415. While it is not necessarily the case that parametric analysis will increase the range of values at each stage of analysis of the overall system, parametric analysis over complex systems tends to have an exponentially-increasing set of possible outcomes. Various methodologies may be used to reduce complexity, state space, and uncertainty in parametric analyses of complex systems.

Figure 19:
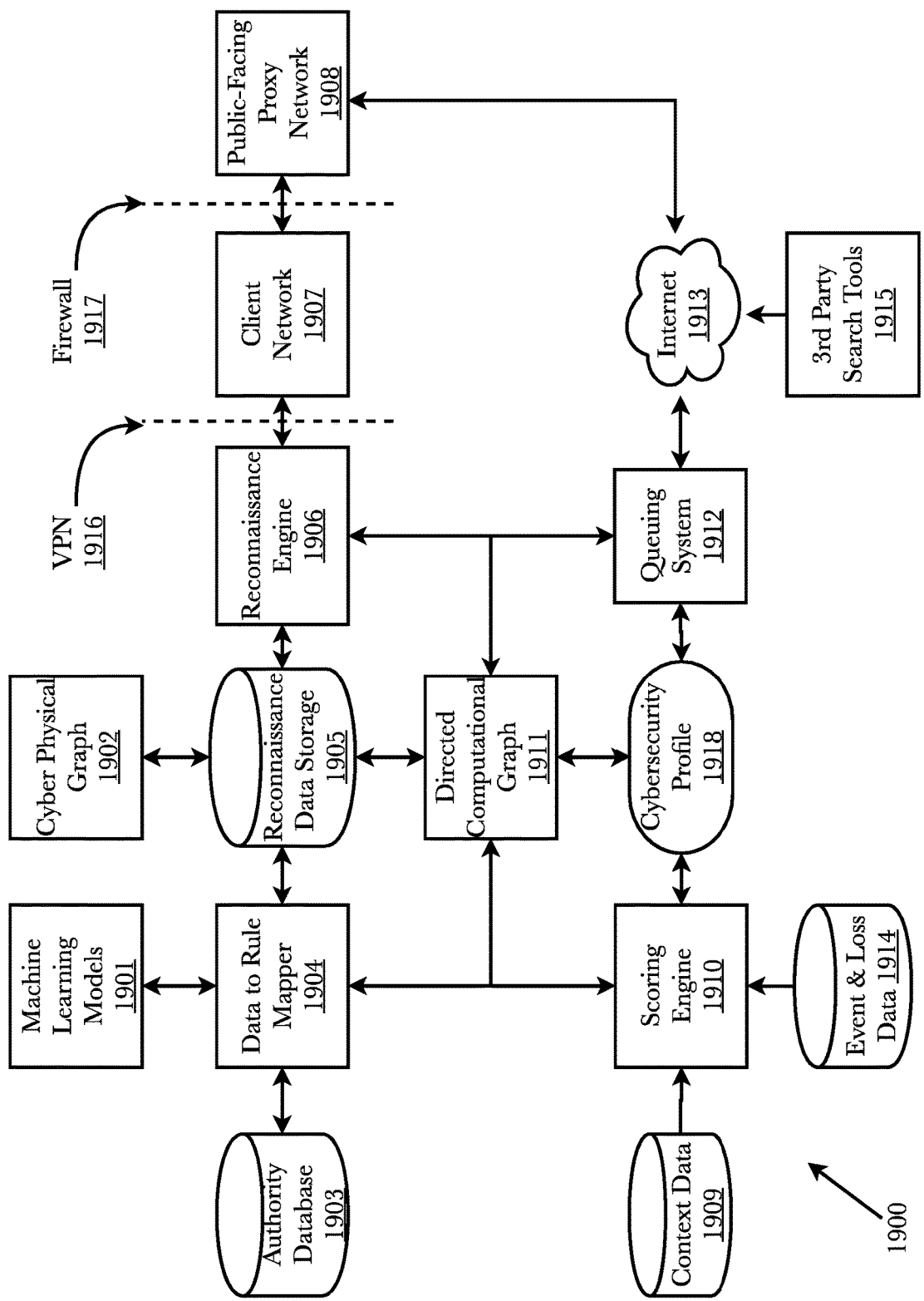
FIG. 19 is block diagram showing an exemplary system architecture for a system for cybersecurity profiling and rating.

FIG. 19 is block diagram showing an exemplary system architecture 1900 for a system for cybersecurity profiling and rating. The system in this example contains a cyber-physical graph 1902 which is used to represent a complete picture of an organization's infrastructure and operations including, importantly, the organization's computer network infrastructure particularly around system configurations that influence cybersecurity protections and resiliency. The system further contains a directed computational graph 1911, which contains representations of complex processing pipelines and is used to control workflows through the system such as determining which 3$^{rd}$ party search tools 1915 to use, assigning search tasks, and analyzing the cyber-physical graph 1902 and comparing results of the analysis against reconnaissance data received from the reconnaissance engine 1906 and stored in the reconnaissance data storage 1905. In some embodiments, the determination of which 3$^{rd}$ party search tools 1915 to use and assignment of search tasks may be implemented by a reconnaissance engine 1906. The cyber-physical graph 1902 plus the analyses of data directed by the directed computational graph on the reconnaissance data received from the reconnaissance engine 1906 are combined to represent the cyber-security profile 1918 of the client organization whose network 1907 is being evaluated. A queuing system 1912 is used to organize and schedule the search tasks requested by the reconnaissance engine 1906. A data to rule mapper 1904 is used to retrieve laws, policies, and other rules from an authority database 1903 and compare reconnaissance data received from the reconnaissance engine 1906 and stored in the reconnaissance data storage 1905 against the rules in order to determine whether and to what extent the data received indicates a violation of the rules. Machine learning models 1901 may be used to identify patterns and trends in any aspect of the system, but in this case are being used to identify patterns and trends in the data which would help the data to rule mapper 1904 determine whether and to what extent certain data indicate a violation of certain rules. A scoring engine 1910 receives the data analyses performed by the directed computational graph 1911, the output of the data to rule mapper 1904, plus event and loss data 1914 and contextual data 1909 which defines a context in which the other data are to be scored and/or rated. A public-facing proxy network 1908 is established outside of a firewall 1917 around the client network 1907 both to control access to the client network from the Internet 1913, and to provide the ability to change the outward presentation of the client network 1907 to the Internet 1913, which may affect the data obtained by the reconnaissance engine 1906. In some embodiments, certain components of the system may operate outside the client network 1907 and may access the client network through a secure, encrypted virtual private network (VPN) 1916, as in a cloud-based or platform-as-a-service implementation, but in other embodiments some or all of these components may be installed and operated from within the client network 1907.

As a brief overview of operation, information is obtained about the client network 1907 and the client organization's operations, which is used to construct a cyber-physical graph 1902 representing the relationships between devices, users, resources, and processes in the organization, and contextualizing cybersecurity information with physical and logical relationships that represent the flow of data and access to data within the organization including, in particular, network security protocols and procedures. The directed computational graph 1911 containing workflows and analysis processes, selects one or more analyses to be performed on the cyber-physical graph 1902. Some analyses may be performed on the information contained in the cyber-physical graph, and some analyses may be performed on or against the cyber-physical graph using information obtained from the Internet 1913 from reconnaissance engine 1906. The workflows contained in the directed computational graph 1911 select one or more search tools to obtain information about the organization from the Internet 1915, and may comprise one or more third party search tools 1915 available on the Internet. As data are collected, they are fed into a reconnaissance data storage 1905, from which they may be retrieved and further analyzed. Comparisons are made between the data obtained from the reconnaissance engine 1906, the cyber-physical graph 1902, the data to rule mapper, from which comparisons a cybersecurity profile of the organization is developed. The cybersecurity profile is sent to the scoring engine 1910 along with event and loss data 1914 and context data 1909 for the scoring engine 1910 to develop a score and/or rating for the organization that takes into consideration both the cybersecurity profile, context, and other information.

Figure 20:
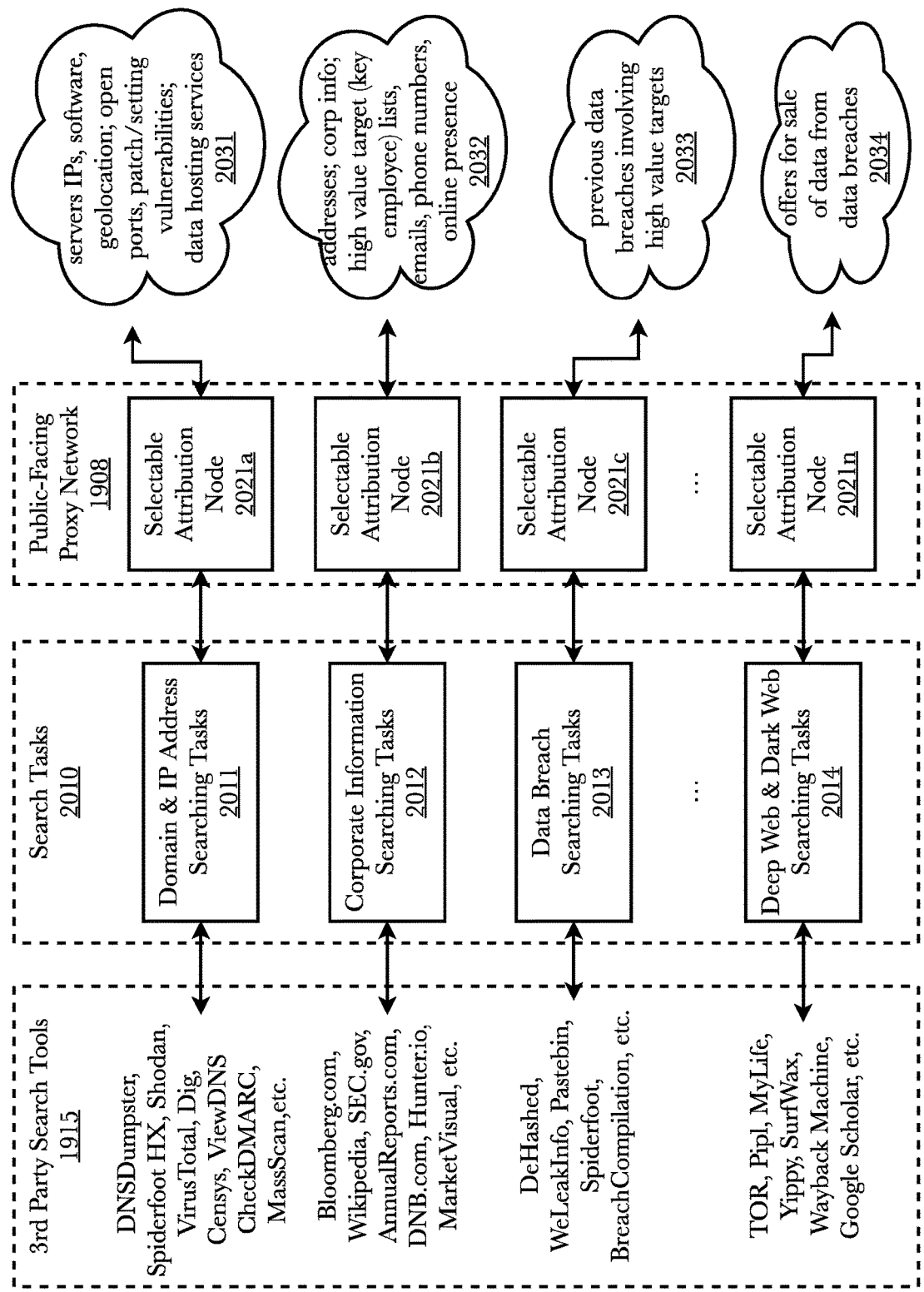
FIG. 20 is a relational diagram showing the relationships between exemplary 3$^{rd}$ party search tools, search tasks that can be generated using such tools, and the types of information that may be gathered with those tasks.

FIG. 20 is a relational diagram showing the relationships between exemplary 3$^{rd}$ party search tools 1915, search tasks 2010 that can be generated using such tools, and the types of information that may be gathered with those tasks 2011-2014, and how a public-facing proxy network 1908 may be used to influence the search task results. While the use of 3$^{rd}$ party search tools 1915 is in no way required, and proprietary or other self-developed search tools may be used, there are numerous 3$^{rd}$ party search tools 1915 available on the Internet, many of them available for use free of charge, that are convenient for purposes of performing external and internal reconnaissance of an organization's infrastructure. Because they are well-known, they are included here as examples of the types of search tools that may be used and the reconnaissance data that may be gathered using such tools. The search tasks 2010 that may be generated may be classified into several categories. While this category list is by no means exhaustive, several important categories of reconnaissance data are domain and internet protocol (IP) address searching tasks 2011, corporate information searching tasks 2012, data breach searching tasks 2013, and dark web searching tasks 2014. Third party search tools 1915 for domain and IP address searching tasks 2011 include, for example, DNSDumpster, Spiderfoot HX, Shodan, VirusTotal, Dig, Censys, ViewDNS, and CheckDMARC, among others. These tools may be used to obtain reconnaissance data about an organization's server IPs, software, geolocation; open ports, patch/setting vulnerabilities; data hosting services, among other data 2031. Third party search tools 1915 for corporate information searching tasks 2012 include, for example, Bloomberg.com, Wikipedia, SEC.gov, AnnualReports.com, DNB.com, Hunter.io, and MarketVisual, among others. These tools may be used to obtain reconnaissance data about an organization's addresses; corp info; high value target (key employee or key data assets) lists, emails, phone numbers, online presence 2032. Third party search tools 1915 for data breach searching tasks 2013 include, for example, DeHashed, WeLeakInfo, Pastebin, Spiderfoot, and BreachCompilation, among others. These tools may be used to obtain reconnaissance data about an organization's previous data breaches, especially those involving high value targets, and similar data loss information 2033. Third party search tools 1915 for deep web (reports, records, and other documents linked to in web pages, but not indexed in search results . . . estimated to be 90% of available web content) and dark web (websites accessible only through anonymizers such as TOR . . . estimated to be about 6% of available web content) searching tasks 2014 include, for example, Pipl, MyLife, Yippy, SurfWax, Wayback machine, Google Scholar, DuckDuckGo, Fazzle, Not Evil, and Start Page, among others. These tools may be used to obtain reconnaissance data about an organization's lost and stolen data such as customer credit card numbers, stolen subscription credentials, hacked accounts, software tools designed for certain exploits, which organizations are being targeted for certain attacks, and similar information 2034. A public-facing proxy network 1908 may be used to change the outward presentation of the organization's network by conducting the searches through selectable attribution nodes 2021*a-n*, which are configurable to present the network to the Internet in different ways such as, but not limited to, presenting the organization network as a commercial IP address, a residential IP address, or as an IP address from a particular country, all of which may influence the reconnaissance data received using certain search tools.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 15:
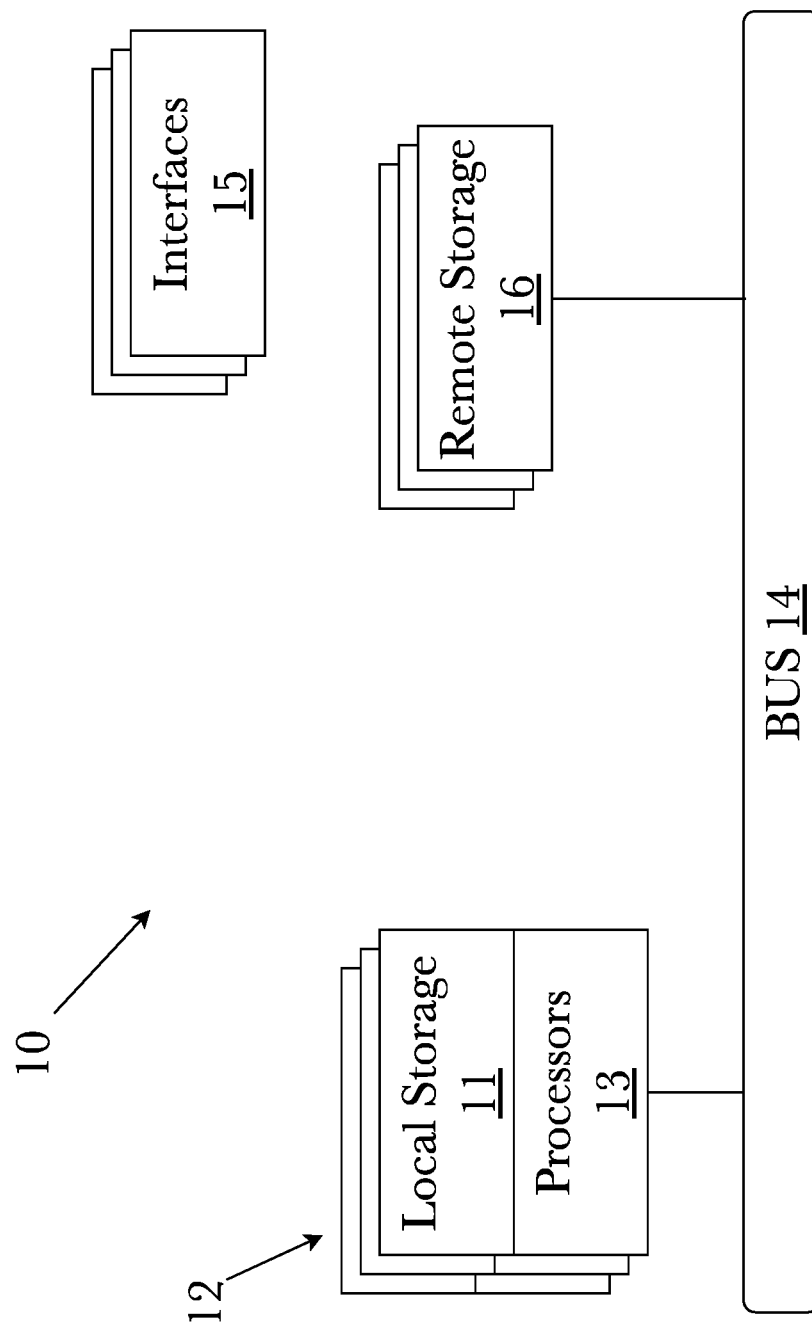
FIG. 15 is a block diagram illustrating an exemplary hardware architecture of a computing device.

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 15 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
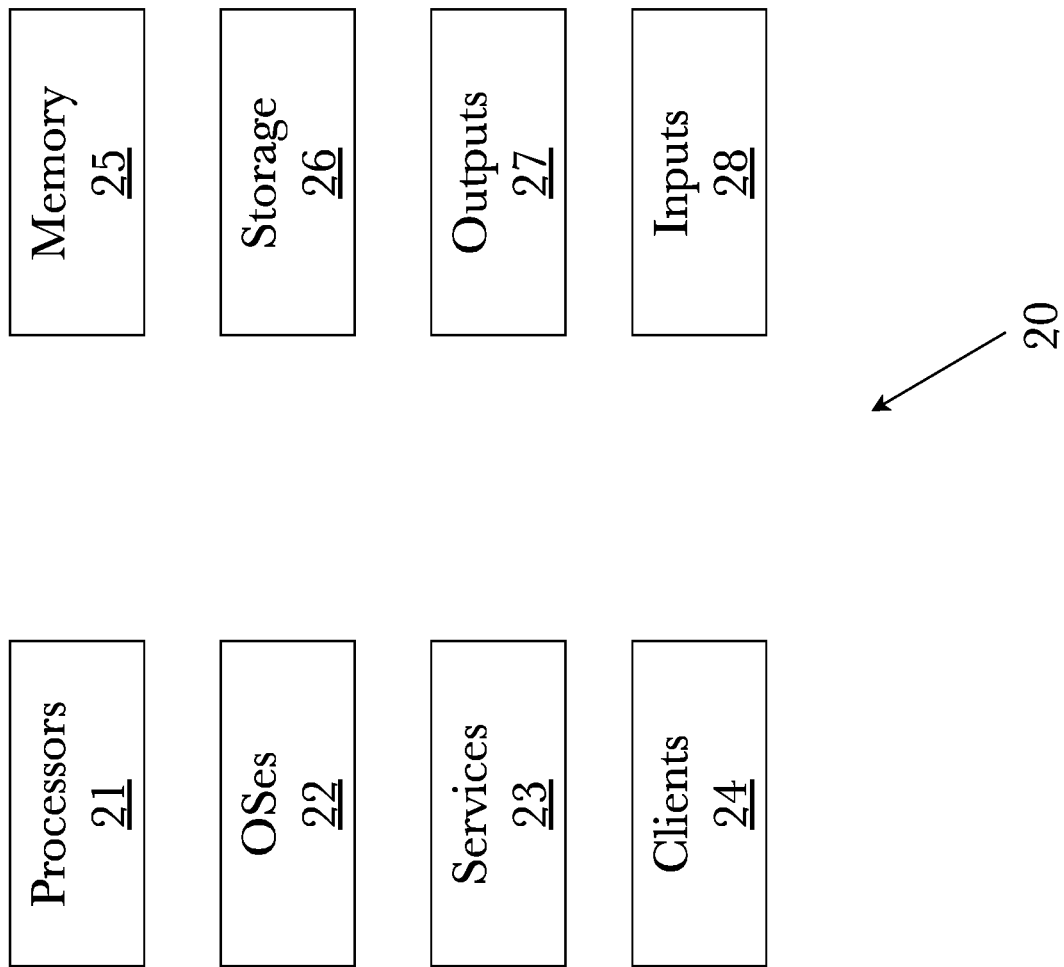
FIG. 16 is a block diagram illustrating an exemplary logical architecture for a client device.

In some aspects, systems may be implemented on a standalone computing system. Referring now to FIG. 16, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

Figure 17:
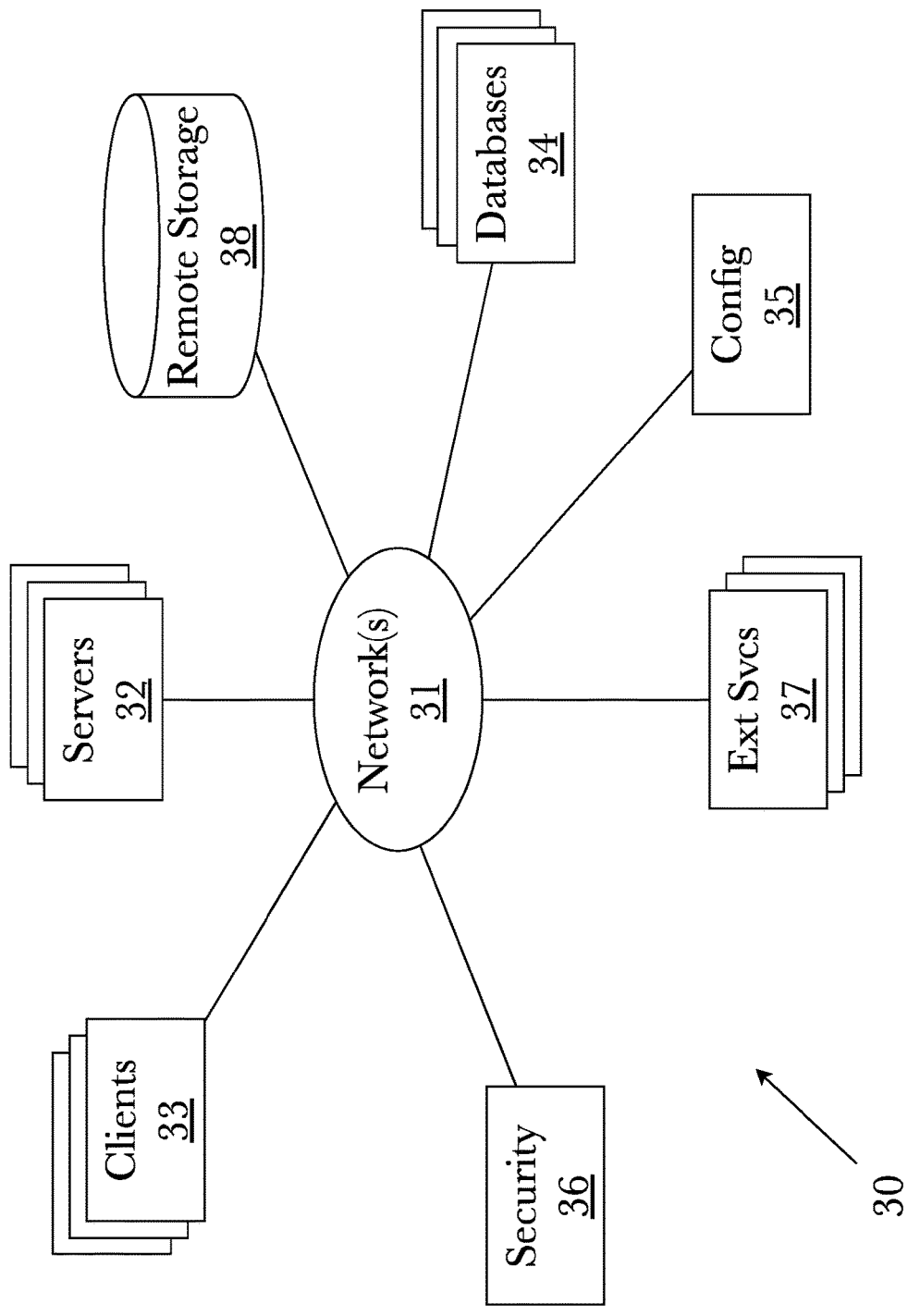
FIG. 17 is a block diagram showing an exemplary architectural arrangement of clients, servers, and external services.

In some aspects, systems may be implemented on a distributed computing network, such as one having any number of clients and/or servers. Referring now to FIG. 17, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 18:
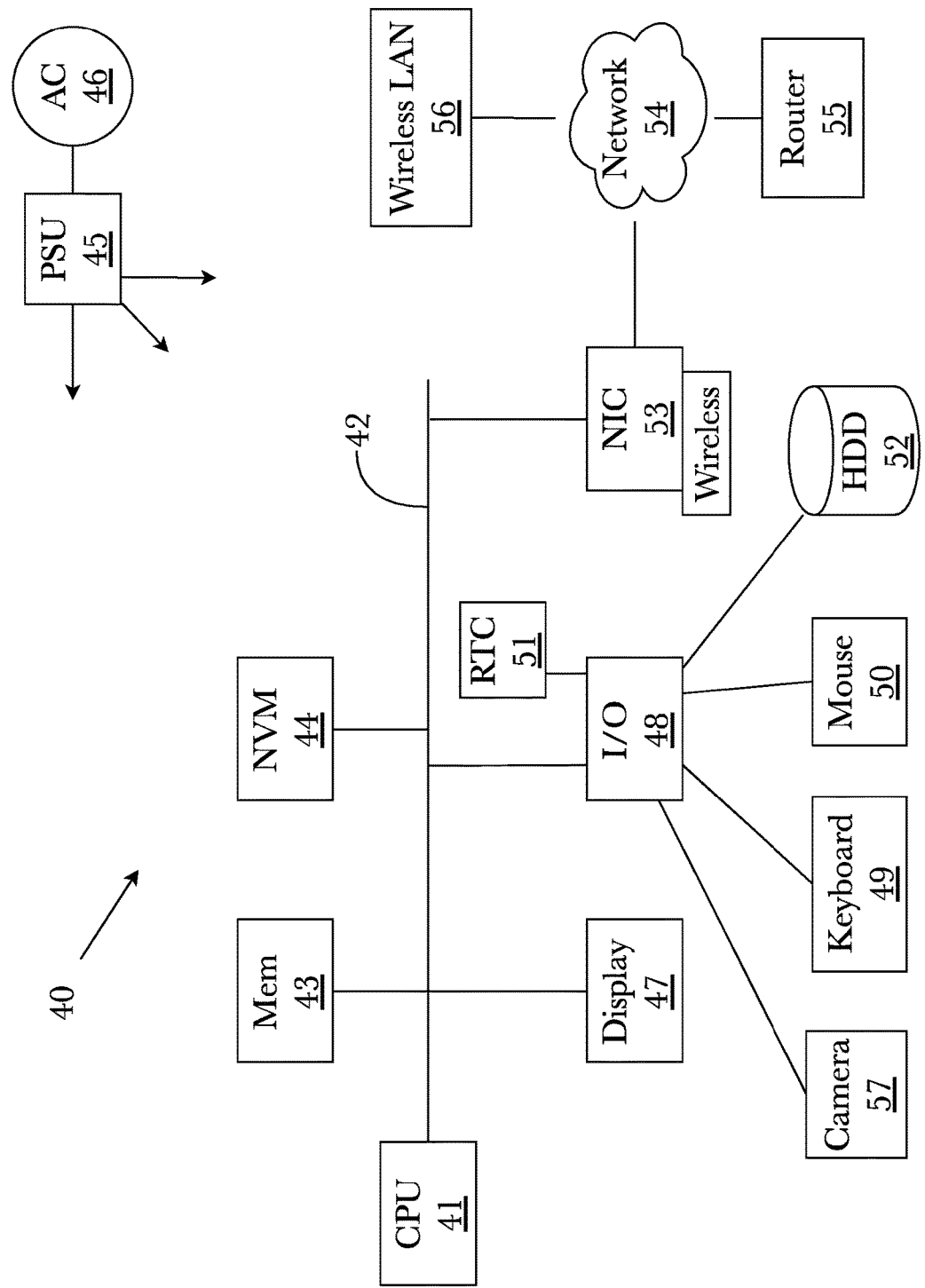
FIG. 18 is another block diagram illustrating an exemplary hardware architecture of a computing device.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for self-adjusting cybersecurity analysis and rating based on heterogeneous data and reconnaissance, comprising:

a computing device comprising a memory, a processor, and a network interface;

a high volume web crawler comprising a first plurality of programming instructions stored in the memory of, and operating on the processor of, the computing device, wherein the first plurality of programming instructions, when operating on the processor, cause the computing device to obtain information from the Internet as directed by an automated planning service module;

an automated planning service module, comprising a second plurality of programming instructions stored in the memory of, and operating on the processor of, the computing device, wherein the second plurality of programming instructions, when operating on the processor, cause the computing device to periodically or continuously establish a score for one or more of the following aspects of cybersecurity analysis by:

defining a target network by identifying internet protocol addresses and subdomains of the target network, verifying domain name system information for each internet protocol address and subdomain of the target network, and assigning an Internet reconnaissance score;

collecting domain name system leak information by identifying improper network configurations in the internet protocol addresses and subdomains of the target network, and assigning a domain name system leak information score;

identifying web applications used by the target network, analyzing the web applications used by the target network to identify vulnerabilities in the web applications that could allow unauthorized access to the target network, and assigning a web application security score;

identifying personnel within the target network, searching social media networks for information of concern related to the personnel identified within the target network, and assigning a social network score;

conducting a scan of the target network for open TCP/UDP ports, and assigning an open port score;

identifying leaked credentials associated with the target network that are found to be disclosed in previous breach incidents, and assigning a credential score;

gathering version and update information for hardware and software systems within the boundary of the target network, checking version and update information for the hardware and software systems within the boundary of the target network, and assigning a patching frequency score; and identifying content of interest contained within the target network, performing an Internet search to identify references to the content of interest, and assigning an open-source intelligence score; and a cybersecurity scoring engine comprising a third plurality of programming instructions stored in the memory of, and operating on the processor of, the computing device, wherein the third plurality of programming instructions, when operating on the processor, cause the computing device to create a weighted cybersecurity score by:

assigning a weight to each of the Internet reconnaissance score, the domain name system leak information score, the web application security score, the social network score, the open port score, the credential score, the patching frequency score, and the open-source intelligence score;

combining the weighted scores into the weighted cybersecurity score; and a feedback engine comprising a fourth plurality of programming instructions stored in the memory of, and operating on the processor of, the computing device, wherein the fourth plurality of programming instructions, when operating on the processor, cause the computing device to:

compare the weighted cybersecurity score to a score set point;

recommend changes to network security for the target network to either increase or decrease network security to bring the score into equilibrium with the score set point.

2. The system of claim 1, further comprising a task scheduling engine comprising a fifth plurality of programming instructions stored in the memory of, and operating on the processor of, the computing device, wherein the fifth plurality of programming instructions, when operating on the processor, cause the computing device to schedule computer tasks and programs to run at certain intervals.

3. A method for self-adjusting cybersecurity analysis and rating based on heterogeneous data and reconnaissance, comprising the steps of:

establishing a score for one or more of the following aspects of cybersecurity analysis by:

defining a target network by identifying internet protocol addresses and subdomains of the target network, verifying domain name system information for each internet protocol address and subdomain of the target network, and assigning an Internet reconnaissance score;

collecting domain name system leak information by identifying improper network configurations in the internet protocol addresses and subdomains of the target network, and assigning a domain name system leak information score;

identifying web applications used by the target network, analyzing the web applications used by the target network to identify vulnerabilities in the web applications that could allow unauthorized access to the target network, and assigning a web application security score;

identifying personnel within the target network, searching social media networks for information of concern related to the personnel identified within the target network, and assigning a social network score;

conducting a scan of the target network for open TCP/UDP ports, and assigning an open port score;

identifying leaked credentials associated with the target network that are found to be disclosed in previous breach incidents, and assigning a credential score;

gathering version and update information for hardware and software systems within the boundary of the target network, checking version and update information for the hardware and software systems within the boundary of the target network, and assigning a patching frequency score; and identifying content of interest contained within the target network, performing an Internet search to identify references to the content of interest, and assigning an open-source intelligence score; and creating a weighted cybersecurity score by:

assigning a weight to each of the Internet reconnaissance score, the domain name system leak information score, the web application security score, the social network score, the open port score, the credential score, the patching frequency score, and the open-source intelligence score; and combining the weighted scores into the weighted cybersecurity score;

comparing the weighted cybersecurity score to a score set point;

recommending changes to network security for the target network to either increase or decrease network security to bring the score into equilibrium with the score set point.

4. The method of claim 3, further comprising the step of scheduling computer tasks and programs to run at certain intervals.

* * * * *